United States Patent
Sheikh et al.

(10) Patent No.: US 11,412,136 B2
(45) Date of Patent: Aug. 9, 2022

(54) APPARATUS AND METHOD FOR OPERATING MULTIPLE CAMERAS FOR DIGITAL PHOTOGRAPHY

(71) Applicant: Samsung Electronics Co., Ltd., Suwon-si (KR)

(72) Inventors: Hamid R. Sheikh, Allen, TX (US); Youngjun Yoo, Plano, TX (US); John Seokjun Lee, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 16/704,982

(22) Filed: Dec. 5, 2019

(65) Prior Publication Data

US 2020/0186710 A1 Jun. 11, 2020

Related U.S. Application Data

(60) Provisional application No. 62/776,545, filed on Dec. 7, 2018.

(51) Int. Cl.
*H04N 5/232* (2006.01)
*H04N 5/225* (2006.01)
(Continued)

(52) U.S. Cl.
CPC ....... *H04N 5/23238* (2013.01); *H04N 5/2258* (2013.01); *H04N 5/23245* (2013.01); *H04N 5/23299* (2018.08); *H04N 5/2621* (2013.01)

(58) Field of Classification Search
CPC . H04N 5/2259; H04N 5/3415; H04N 5/23238
See application file for complete search history.

(56) References Cited

U.S. PATENT DOCUMENTS 7,912,319 B2 3/2011 Lakshamanan et al.
8,189,100 B2 5/2012 Li et al.
(Continued)

FOREIGN PATENT DOCUMENTS

CN 1922894 A 2/2007
CN 103384307 A 11/2013
(Continued)

OTHER PUBLICATIONS

Supplementary European Search Report dated Sep. 6, 2021 in connection with European Patent Application No. 19891857.5, 15 pages.

(Continued)

*Primary Examiner* — Christopher K Peterson

(57) ABSTRACT

A method includes, in a first mode, positioning first and second tiltable image sensor modules of an image sensor array of an electronic device so that a first optical axis of the first tiltable image sensor module and a second optical axis of the second tiltable image sensor module are substantially perpendicular to a surface of the electronic device, and the first and second tiltable image sensor modules are within a thickness profile of the electronic device. The method also includes, in a second mode, tilting the first and second tiltable image sensor modules so that the first optical axis of the first tiltable image sensor module and the second optical axis of the second tiltable image sensor module are not perpendicular to the surface of the electronic device, and at least part of the first and second tiltable image sensor modules are no longer within the thickness profile of the electronic device.

22 Claims, 15 Drawing Sheets

(51) Int. Cl.
*H04N 5/262* (2006.01)
*H04N 5/222* (2006.01)
*H04N 5/235* (2006.01)
*H04N 5/341* (2011.01)

(56) References Cited

U.S. PATENT DOCUMENTS

| | | | |
|---|---|---|---|
| 9,442,363 | B2 | 9/2016 | Seo et al. |
| 9,906,721 | B2 | 2/2018 | Evans, V et al. |
| 10,135,963 | B2 | 11/2018 | Kim et al. |
| 2008/0225129 | A1 | 9/2008 | Viinikanoja et al. |
| 2011/0128393 | A1* | 6/2011 | Tavi ............... H04N 5/2257 348/218.1 |
| 2015/0085083 | A1 | 3/2015 | Chen et al. |
| 2015/0092076 | A1 | 4/2015 | Campbell et al. |
| 2015/0334309 | A1 | 11/2015 | Peng et al. |
| 2016/0028964 | A1 | 1/2016 | Lee |
| 2016/0182791 | A1 | 6/2016 | Lewkow et al. |
| 2017/0019606 | A1 | 1/2017 | Campbell et al. |
| 2017/0070720 | A1* | 3/2017 | Bishop ............... G06T 7/593 |
| 2017/0366749 | A1* | 12/2017 | Zolotov ............ H04N 13/239 |
| 2018/0139364 | A1 | 5/2018 | Jannard |
| 2018/0139382 | A1 | 5/2018 | Venkataraman et al. |

FOREIGN PATENT DOCUMENTS

| | | |
|---|---|---|
| CN | 105993177 A | 10/2016 |
| CN | 107950018 A | 4/2018 |
| CN | 108696673 A | 10/2018 |
| CN | 108833746 A | 11/2018 |
| CN | 109639974 A | 4/2019 |
| EP | 2661074 A2 | 11/2013 |
| JP | 2010245831 A | 10/2010 |
| JP | 2011048283 A | 3/2011 |
| JP | 2017040542 A | 2/2017 |
| WO | 2005081545 A1 | 9/2005 |
| WO | 2009142332 A1 | 11/2009 |
| WO | 2017039853 A1 | 3/2017 |
| WO | 2018188609 A1 | 10/2018 |

OTHER PUBLICATIONS

International Search Report and Written Opinion of the International Searching Authority regarding International Patent Application No. PCT/KR2019/017221 dated Mar. 16, 2020, 11 pages.
Supplementary Partial European Search Report dated Jun. 1, 2021 in connection with European Patent Application No. 19891857.5, 14 pages.
"Leaked image teases Nokia phone with five cameras," The Verge, https://www.theverge.com/circuitbreaker, Sep. 7, 2018, 4 pages.
"L16 User Guide," light.co, Dec. 2017, 67 pages.
First Office Action dated Jun. 17, 2022 in connection with counterpart Chinese Patent Application No. 201980074506.8, 20 pages.

* cited by examiner

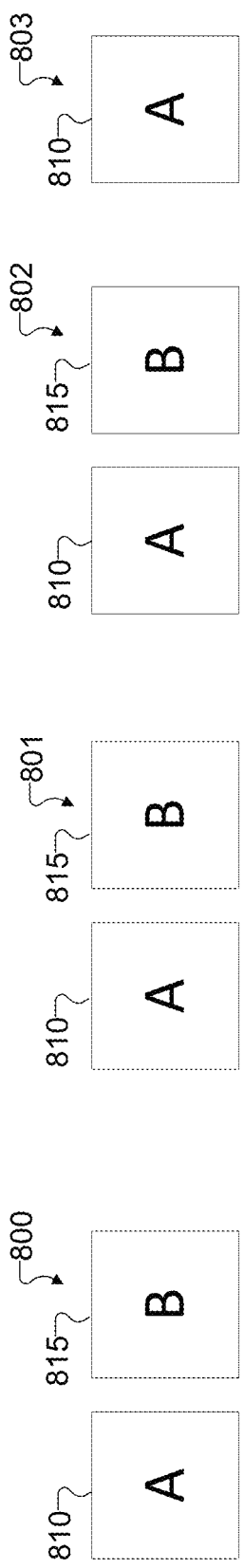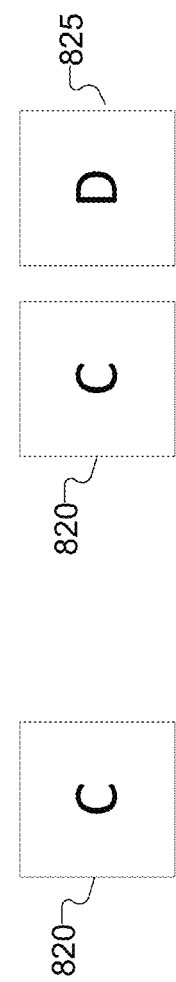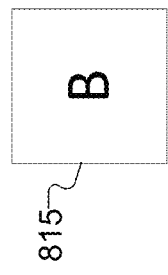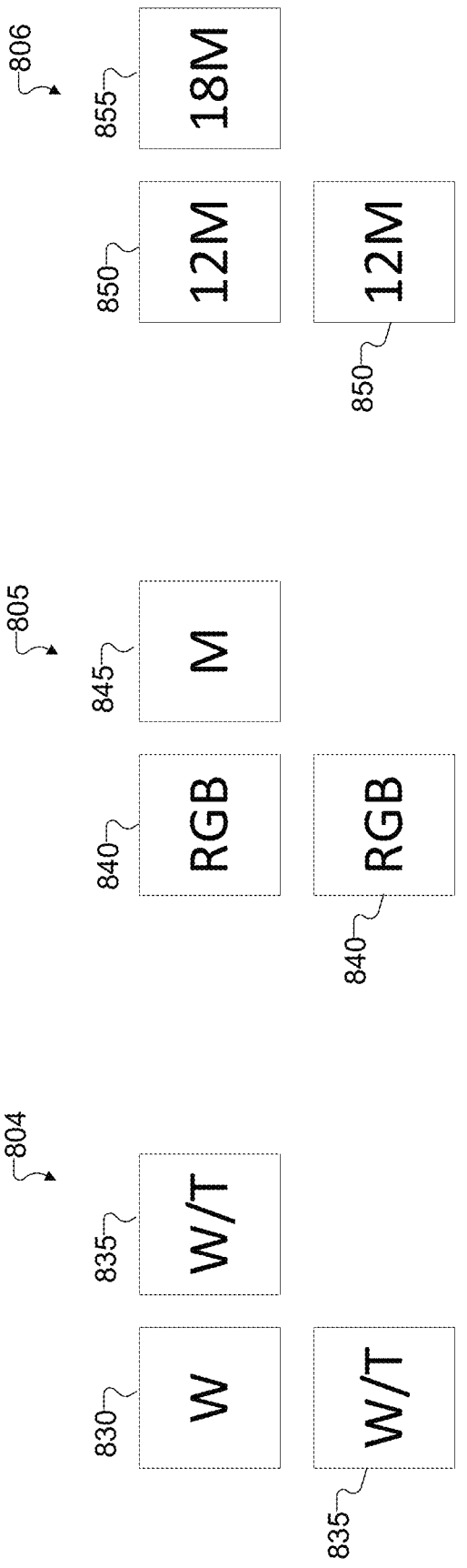

APPARATUS AND METHOD FOR OPERATING MULTIPLE CAMERAS FOR DIGITAL PHOTOGRAPHY

CROSS-REFERENCE TO RELATED APPLICATION AND PRIORITY CLAIM

This application claims priority under 35 U.S.C. § 119(e) to U.S. Provisional Patent Application No. 62/776,545 filed on Dec. 7, 2018. This provisional application is hereby incorporated by reference in its entirety.

TECHNICAL FIELD

This disclosure relates generally to image capturing systems. More specifically, this disclosure relates to an apparatus and method for operating multiple cameras for digital photography.

BACKGROUND

Single sensor or camera-based digital photography devices have reached saturation in terms of image quality and usable functionality. As a result, many smartphone vendors have begun selling multi-camera devices that provide additional functionality, such as zoom, improved low light photography, and wide-angle field of view (FOV). Others have tried to build multi-camera devices in "array" configurations, such as by using up to sixteen small fixed cameras in a four-by-four configuration or movable FOV cameras using mirror devices. One potential benefit of array cameras is that, with proper array components, multiple cameras operating together can improve the photography experience beyond what can be achieved with a single camera or with separate cameras operating independently. However, so far, array cameras have not seen good success in the market since the cost of building array cameras is high, the user benefits provided have been limited, and system architecture enhancements needed to build array cameras on consumer devices (such as smartphones) have not come together seamlessly.

SUMMARY

This disclosure provides an apparatus and method for operating multiple cameras for digital photography.

In a first embodiment, a method includes, in a first mode, positioning first and second tiltable image sensor modules of an image sensor array of an electronic device so that a first optical axis of the first tiltable image sensor module and a second optical axis of the second tiltable image sensor module are substantially perpendicular to a surface of the electronic device, and the first and second tiltable image sensor modules are within a thickness profile of the electronic device. The method also includes, in a second mode, tilting the first and second tiltable image sensor modules so that the first optical axis of the first tiltable image sensor module and the second optical axis of the second tiltable image sensor module are not perpendicular to the surface of the electronic device, and at least part of the first and second tiltable image sensor modules are no longer within the thickness profile of the electronic device.

In a second embodiment, an electronic device includes an image sensor array and at least one processing device operatively coupled to the image sensor array. The image sensor array includes first and second tiltable image sensor modules. The image sensor array is configured to operate in a first mode in which a first optical axis of the first tiltable image sensor module and a second optical axis of the second tiltable image sensor module are substantially perpendicular to a surface of the electronic device, and the first and second tiltable image sensor modules are within a thickness profile of the electronic device. The image sensor array is also configured to operate in a second mode in which the first optical axis of the first tiltable image sensor module and the second optical axis of the second tiltable image sensor module are not perpendicular to the surface of the electronic device, and at least part of the first and second tiltable image sensor modules are no longer within the thickness profile of the electronic device. The at least one processing device is configured to control a tilting of the first and second tiltable image sensor modules between the first mode and the second mode.

In a third embodiment, a method for operating an electronic device with an image sensor array includes capturing, by an image sensor module, a stream from a pixel array. The method also includes processing, by the image sensor module, the stream to generate a preview stream and a full frame stream. The method further includes compressing, by the image sensor module, the preview stream using a first compression and the full frame stream using a second compression. In addition, the method includes outputting, by the image sensor module, the compressed preview stream and the compressed full frame stream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 8A, 8B, 8C, 8D, 8E, 8F, and 8G illustrate example camera arrays in accordance with this disclosure;

DETAILED DESCRIPTION

Figure 1:
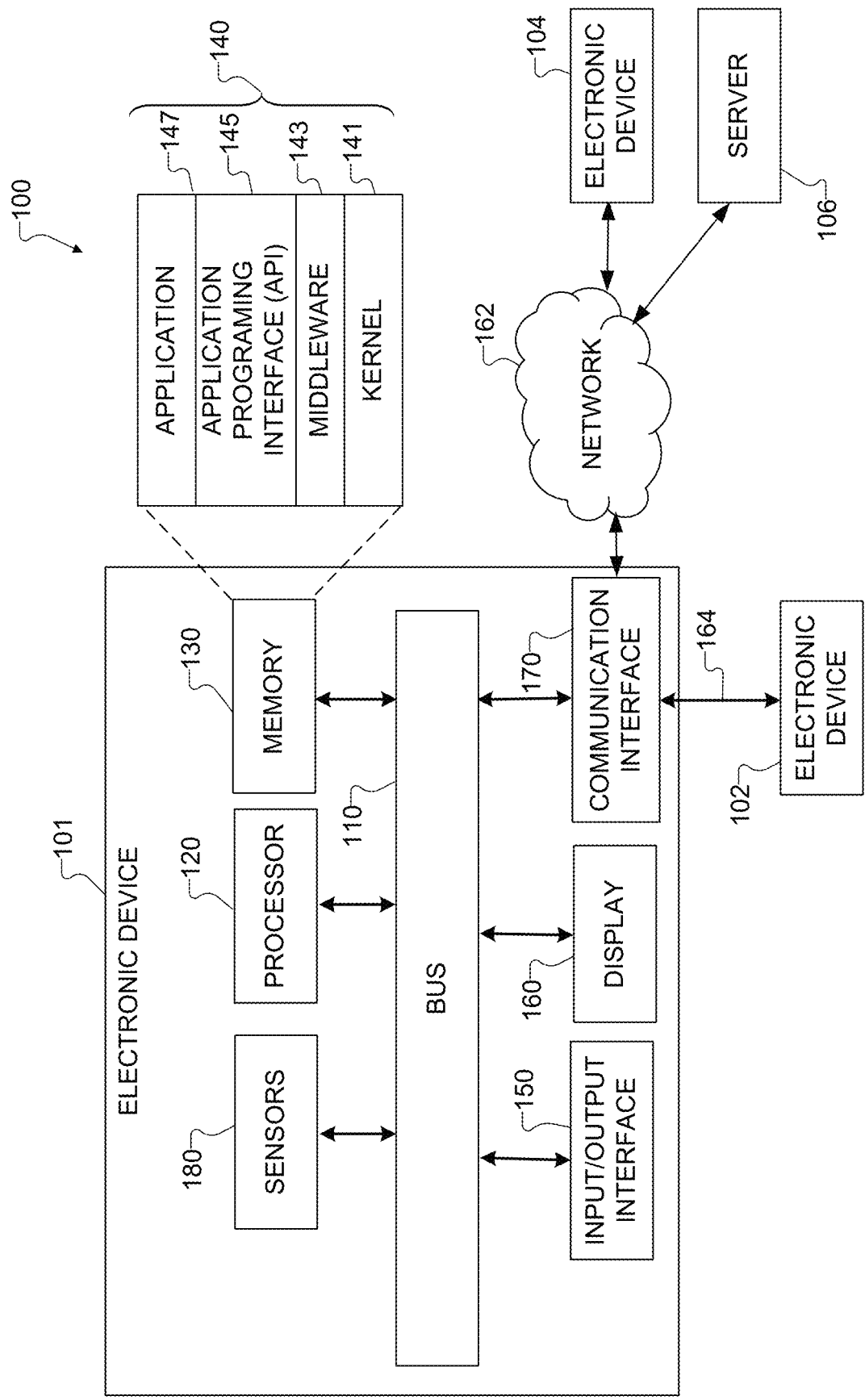
FIG. 1 illustrates an example network configuration including an electronic device in accordance with this disclosure.

FIGS. 1 through 16F, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, one potential benefit of array cameras is that, with proper array components, multiple cameras operating together can improve the photography experience beyond what can be achieved with a single camera or with separate cameras operating independently. However, so far, array cameras have not seen good success in the market since the cost of building array cameras is high, the user benefits provided have been limited, and system architecture enhancements needed to build array cameras on consumer devices (such as smartphones) have not come together seamlessly. Moreover, array cameras have had limited success in consumer photography due to bulkiness, power consumption, and few user benefits given the cost.

One challenge here involves the efficient use of a multi-camera system. For example, many devices in the market have a linear array of mostly-independent cameras that do not provide the maximum benefits achievable using multi-camera configurations. Another challenge here is that current devices have significantly non-traditional designs (so they cannot be easily mass-produced), are too bulky and costly in design for use in thin form factors (such as for smartphones), or use configurations that cannot be handled using traditional image processing techniques. Further, current devices are challenged to maximize the use cases of array cameras in order to provide improved user benefits or an increased number of usage modes. In addition, current array camera uses are often focused on only low-light photography, high dynamic range (HDR) imaging, and multi-based Bokeh effects. This is a direct consequence of the fact that current array camera configurations that can fit into mobile form factors have fixed fields of view (FOVs) that are all very similar. A final challenge here involves reducing or minimizing power consumption when multiple camera modules are used in an electronic device (particularly a mobile device).

This disclosure provides various techniques for using a camera array or other image sensor array for digital photography. In some embodiments, an array includes wide-angle cameras or other image sensors and optionally at least one telephoto camera or other image sensor or other type(s) of image sensor(s). As an example, the wide-angle camera may have a 35 millimeter film camera equivalent focal length of 28 millimeters Each wide-angle image sensor may operate with a movable field of view. In a "normal" mode of operation, all image sensors can point in one direction and allow for computational imaging algorithms to benefit from the use of an array configuration (such as better synthetic lens blur, low light imaging, motion blur reduction, high dynamic range video, or high frame rate video). In a "panoramic" or "pano" mode of operation, the wide-angle image sensors tilt outwards to provide a panoramic capture of a scene. This allows an electronic device to capture distortion free wide-angle pictures, which can additionally be enhanced with synthetic lens blur effects or other effects.

Depending on the implementation, an electronic device may use an array of standard or custom camera components to build an array of image sensors, and the configuration may include wide, telephoto, or other type(s) of image sensors as needed or desired. Also, in some cases, an electronic device may utilize "pop-out" image sensor modules that change the field of view of different image sensors by physically moving the image sensors. In at least one mode, these pop-out image sensor modules can move the image sensors so that they are diverging and mostly disjoint (but possibly with partial overlap) in their fields of view. This can be accomplished without the need for mirrors or folded optics that add significant bulk to the overall design. Also, these pop-out image sensor modules can expand the usability of the imaging array to include additional functionality, such as single-shot panoramic photography, as well as to new use cases, such as "pano-Bokeh". In particular embodiments, the pop-out mechanisms can be used to minimize device bulk and thickness while still supporting panoramic photography. Additional features described below include functions for optimizing system architecture components used for camera synchronization and timing as well as for power reduction.

In addition, some embodiments of this disclosure can be used to enhance the user experience. For example, some features that may be used in an electronic device may include (1) one or more "center" cameras used to increase image quality in the center of the field of view during pano mode, (2) one or more monochrome cameras within the array used to improve light sensitivity, (3) a higher pixel size (sensitivity) but lower resolution used to achieve higher light sensitivity, lower noise, and better signal-to-noise ratio (SNR), (4) a global shutter camera used to remove rolling shutter artifacts, (5) one or more cameras with a variable aperture, (6) one or more unconventional cameras, such as coded aperture cameras used to reduce motion blur, cameras with no infrared filters used to improve low light sensitivity, and lenses with higher modulation transfer functions (MTFs) used to produce moiré in images that is then digitally removed using multi-camera multi-frame super resolution, time-of-flight, or depth information, and/or (7) a specialized array to perform only some functionality, such as a multi-baseline camera array only (without a movable FOV) or a panoramic camera array (PCA) only.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by multiple cameras and process the image data to produce images of scenes, and the processor 120 can control multiple camera modules as described below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications for image capture and image processing as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include multiple cameras or other imaging sensors for capturing images of scenes, and the cameras can be, for instance, a camera array that pops-out. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments, the server 106 processes data using a multi-task fusion neural network architecture to perform multiple tasks using the data as described below. In particular embodiments, the server 106 processes image data using the multi-task fusion neural network architecture to perform multiple tasks using the image data and generate images of scenes.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2A:
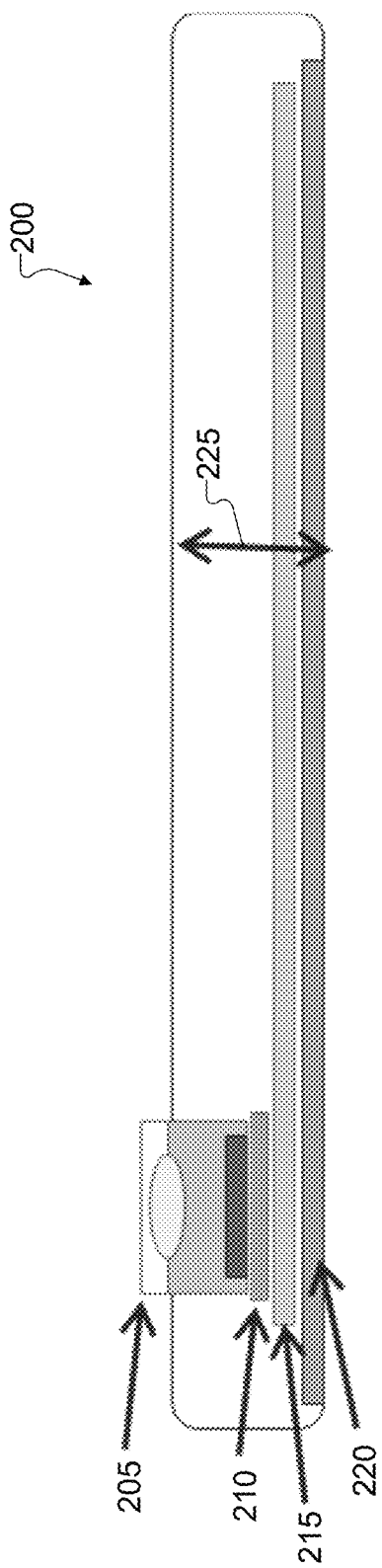
FIGS. 2A, 2B, 2C, and 2D illustrate an example architecture of a camera module in an electronic device in accordance with this disclosure.
Figure 2D:
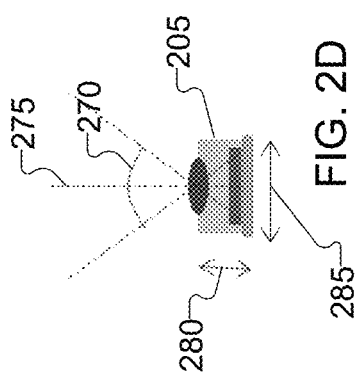
Figures 2B, 2C:
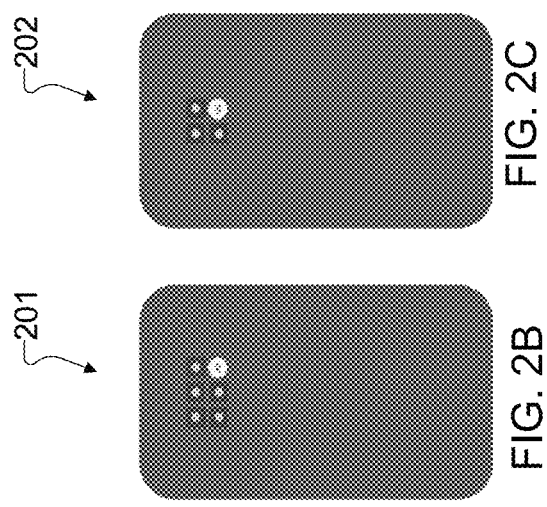

FIGS. 2A, 2B, 2C, and 2D illustrate an example architecture of a camera module 205 in an electronic device 200 in accordance with this disclosure. In particular, FIG. 2A illustrates an example profile of the electronic device 200 with the camera module 205, FIG. 2B illustrates an example four-camera array 201 in the electronic device 200, FIG. 2C illustrates an example two-camera array 202 in the electronic device 200, and FIG. 2D illustrates example dimensions of the camera module 205. The electronic device 200 here may represent the electronic device 101 of FIG. 1, and the camera module 205 here may represent at least some of the sensors 180 in the electronic device 101 of FIG. 1. Note, however, that the electronic device 200 may be used in any other suitable system.

In the example shown in FIG. 2A, the electronic device 200 includes the camera module 205, which is positioned on or otherwise electrically coupled to a camera printed circuit board (PCB) 210. The camera PCB 210 is positioned on or otherwise electrically coupled to a main PCB 215 for the electronic device 200. In addition, the electronic device 200 includes a display 220. As shown here, a thickness 225 of the electronic device 200 is dependent on thicknesses of the camera module 205, the camera PCB 210, the main PCB 215, and the display 220. With current physical limitations of photography, the camera module 205 extends past an outer housing of the electronic device 200. Otherwise, the electronic device 200 would be unnecessarily bulky with an extended housing.

Different electronic devices 200 may include different numbers (and possibly different types) of camera modules 205 in a camera array. For example, FIG. 2B illustrates a four-camera array 201, and FIG. 2C illustrates a two-camera array 202. The four-camera array 201 may be formed with the camera modules positioned in a square configuration, and the two-camera array 202 may be formed with the camera modules in either a horizontal configuration or a vertical configuration. An additional camera module 205 located on the electronic devices 200 in FIGS. 2B and 2C may typically represent a telephoto camera module. Also, each of the electronic devices 200 in FIGS. 2B and 2C may include an LED module that can be used in combination with the camera modules, such as for generating a flash.

In some embodiments, the camera array in FIG. 2B or 2C may use standard wide-angle or telephoto camera modules that are commonly used with smartphones. As shown in FIG. 2D, a depth 280 and width 285 of the camera module 205 can vary, but the size is generally determined based on a focal length and field of view 270. For example, a wide-angle camera module 205 may be a 12 megapixel (MP) 1/2.5" 28 mm equivalent focal length camera module, or the camera module 205 can use a 32 MP 28 mm camera module. A typical field of view 270 of the wide-angle camera can be about 60 degrees horizontally. A telephoto camera module 205 may provide 2× total optical zoom with an equivalent focal length of 56 mm using a 12 MP sensor. The typical field of view 270 of the telephoto camera can be about 30 degrees horizontally. The use of a two-dimensional array configuration of array cameras (such as in "4×1+1" and "2×1+1" configurations as shown in FIGS. 2B and 2C) allows for better use of a baseline diversity. Thus, one of the array cameras could be designated as a "main" or "reference" camera with respect to which the other cameras can be operated.

Although FIGS. 2A, 2B, 2C, and 2D illustrate one example of an architecture of a camera module 205 in an electronic device 200, various changes may be made to FIGS. 2A, 2B, 2C, and 2D. For example, the electronic device 200 may include two or more image sensors in any other suitable configuration. Also, the specific types of image sensors described above are for illustration and do not limit this disclosure to any specific image sensor types, sizes, or resolutions.

FIGS. 3A, 3B, 3C, and 3D illustrate an example normal mode 300 and an example panoramic ("pano") mode 305 in accordance with this disclosure. For ease of explanation, the modes 300 and 305 may be described as being used with the electronic device 200 of FIG. 2, which could represent the electronic device 101 of FIG. 1. However, the modes 300 and 305 may be used with any suitable electronic device and in any suitable system.

Figure 3A:
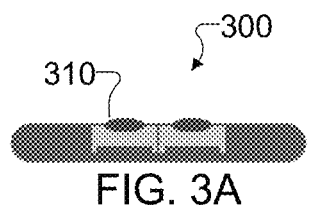
FIGS. 3A, 3B, 3C, and 3D illustrate an example normal mode and an example panoramic ("pano") mode in accordance with this disclosure.

As shown in FIG. 3A, in the normal mode 300, camera modules in a camera array 310 are in a normal or predefined position within a housing of the electronic device 200. In this mode, the optical axes 275 of the camera modules are substantially perpendicular to a back surface of the housing of the electronic device 200 and are substantially parallel to each other. As shown in FIG. 3C, a combined field of view 320 of the camera modules in the camera array 310 during the normal mode has significant overlap between the individual fields of view 270 of the camera modules. Thus, in the normal mode 300, an image having greater detail can be generated by combining the images produced from the array cameras. For example, the overlap between the individual fields of view 270 can provide depth information to be used to enhance the quality or focus of a final generated image. Moreover, in the normal mode 300, the overlapping fields of view 270 provide algorithmic opportunities for multi-baseline depth estimation, synthetic lens simulation, light sensitivity improvement, motion blur reduction, high dynamic range imaging, high frame rate imaging, super-resolution, aperture stacking (same scene captured with different aperture sizes), and focal stacking (for synthetic lenses).

In the cases of multi-baseline depth estimation, synthetic lens simulation, and super-resolution, all overlapping cameras can be configured similarly in terms of aperture, exposure time, and ISO. In the case of motion blur reduction, all cameras can be set to the same focal point, the reference/main camera can be set to one exposure time/ISO setting, and the other cameras can be set to higher/lower ISO settings and corresponding gains to capture the same scene with different amounts of motion blur/sensor noise. In the case of high dynamic range imaging, the overlapping cameras can be set to capture higher/lower total exposures (such as EV−2, EV−1, EV−0, and EV+1). In the cases of focal stacking and aperture stacking, the camera lens array can be configured so that one camera captures a scene with one focal distance and/or aperture, and other cameras capture the same scene with different focal distances and/or apertures.

Figure 3B:
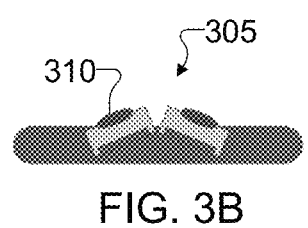
Figure 3C:
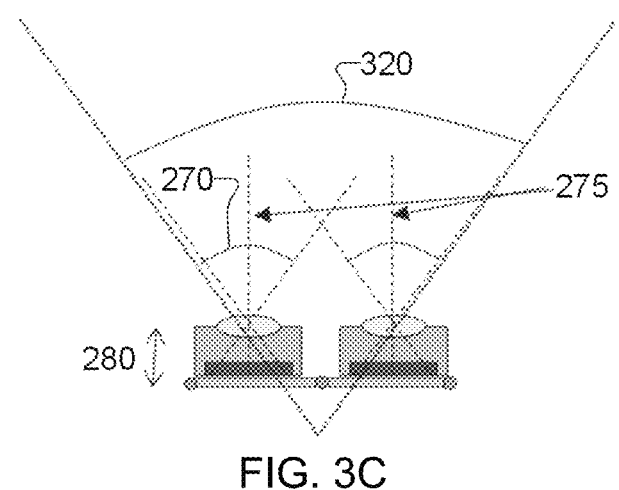
Figure 3D:
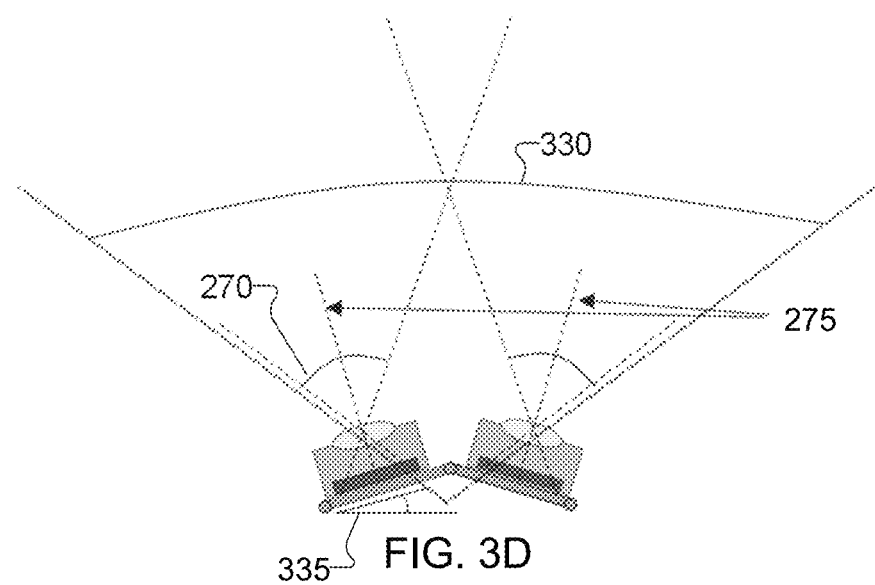

As shown in FIG. 3B, in the pano mode 305, the cameras modules in the camera array 310 are angled away from each other. In other words, the optical axes 275 are tilted at opposing angles. The tilted optical axes 275 achieve a pano array field of view 330 that is much wider than the normal array field of view 320. The camera array 310 can produce a full panoramic image without needing to move the electronic device 200 itself. This allows for the image to not be affected by movement of the electronic device 200 or movement within the image itself since images can be captured by the camera modules in the camera array 310 at the same time. In addition, warping is reduced due to the entire image being captured at the same time. As shown in FIG. 3D, in the pano mode 305, the individual fields of view 270 of the cameras overlap only in a small region. This provides algorithmic opportunities for functions such as panoramic stitching and simulated lens blur in wide-angle photography. Focal stacking can also be used in the pano mode 305, where one set of cameras produces one pano view at one focal length and another set of cameras produces another pano view at a different focal length and are used to provide simulated lens effects.

Although FIGS. 3A, 3B, 3C, and 3D illustrate one example of a normal mode 300 and an example pano mode 305, various changes may be made to FIGS. 3A, 3B, 3C, and 3D. For example, while two camera modules are shown in the array 310, the array 310 may include more than two camera modules in any suitable arrangement.

FIGS. 4A, 4B, 4C, 4D, 4E, 4F, 4G, 4H, 4I, and 4J illustrate example camera module movements in accordance with this disclosure. For ease of explanation, the camera module movements may be described as being used with the electronic device 200 of FIG. 2A, which could represent the electronic device 101 of FIG. 1. However, the camera module movements may be used with any suitable electronic device and in any suitable system.

Figure 4A:
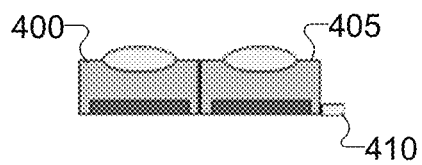
FIGS. 4A, 4B, 4C, 4D, 4E, 4F, 4G, 4H, 4I, and 4J illustrate example camera module movements in accordance with this disclosure.
Figure 4B:
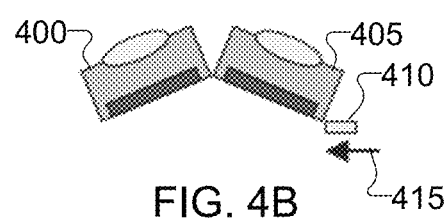
Figure 4C:
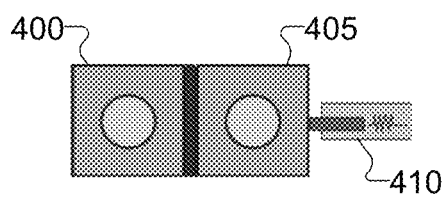
Figure 4D:
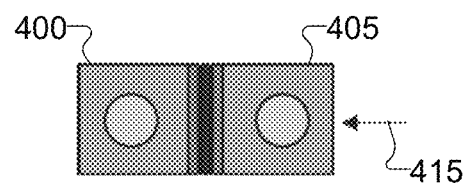

FIG. 4A illustrates an example side view of a first camera module 400 and a second camera module 405 in the normal mode configuration, FIG. 4B illustrates an example side view of the first camera module 400 and the second camera module 405 in the pano mode, FIG. 4C illustrates an example front view of the first camera module 400 and the second camera module 405 in the normal mode configuration, and FIG. 4D illustrates an example front view of the first camera module 400 and the second camera module 405 in the pano mode configuration. These figures therefore relate to a two-camera array. As shown here, an actuator 410 is retracted in FIGS. 4A and 4C, and bases of the camera modules 400, 405 are in planar alignment. As a result, optical planes of the camera modules 400, 405 are parallel to a surface of the electronic device. In the pano mode, the actuator 410 provides motion 415 and is extended as shown in FIGS. 4B and 4D, and the bases of the camera modules 400, 405 form an isosceles triangle with the plane of the actuator 410. As a result, the optical planes of the camera modules 400, 405 are not parallel to a surface of the electronic device.

Figure 4E:
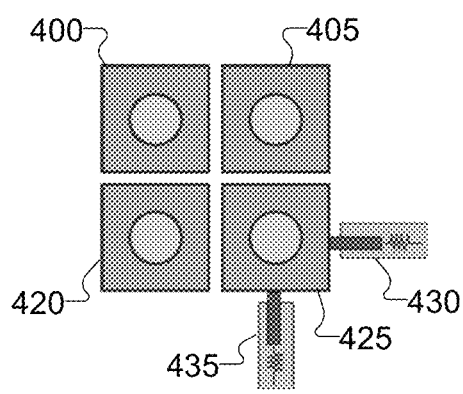
Figure 4F:
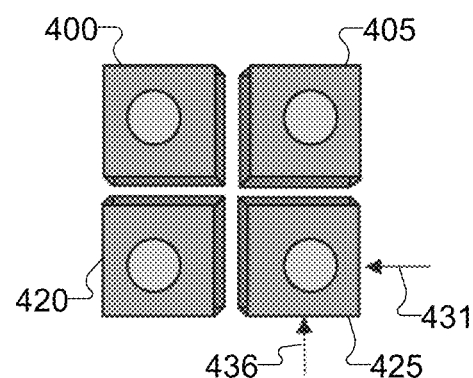
Figure 4G:
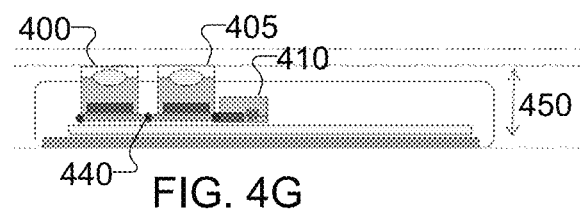
Figure 4H:
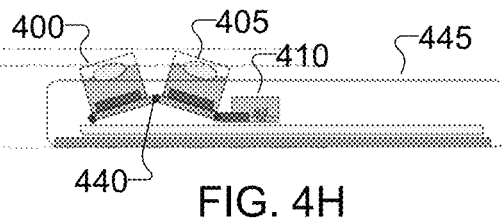

As shown in FIGS. 4G and 4H, a hinge 440 may be used to couple the camera modules 400, 405 to enable the movements shown here. Thus, the movable camera modules 400, 405 may be pushed together from the side so that the camera modules 400, 405 angle outwards. In some cases, the amount of movement outward can be less than half of the field of view of each of the camera modules 400, 405. For example, if the field of view of each camera is 60 degrees horizontally, the actuator 410 may provide a maximum tilt of 25 degrees, at which point the cameras' fields of view would overlap by 10 degrees. Note that while one or more hinges 440 are used here, other mechanical couplings may be used to couple multiple camera modules.

In some embodiments, the actuator 410 only has two usable positions, normal (retracted) and wide (extended). Intermediate positions are defined by transitory movement of the actuator 410 and are not used for image capture in these embodiments. In other embodiments, the actuated fields of view can be adjustable (such as in steps or continuously) between the normal view and the widest view, and various intermediate positions can be selected and used for image capture. Also, in some embodiments, the actuator 410 can be designed to move the camera modules' fields of view horizontally as well as vertically.

FIG. 4E illustrates an example front view of four camera modules 400, 405, 420, 425 in the normal mode configuration, and FIG. 4F illustrates an example front view of the four camera modules 400, 405, 420, 425 in the pano mode configuration. These figures therefore relate to a four-camera array. As shown here, two actuators 430 and 435 are retracted in FIG. 4E, and bases of the camera modules 400, 405, 420, 425 are in planar alignment. In FIG. 4F, the two actuators 430 and 435 have been extended to apply horizontal motion 431 and vertical motion 436, and bases of the camera modules 400, 405, 420, 425 are no longer in planar alignment. This can be accomplished using suitable connections between the camera modules 400, 405, 420, 425, such as hinged connections.

Figure 4I:
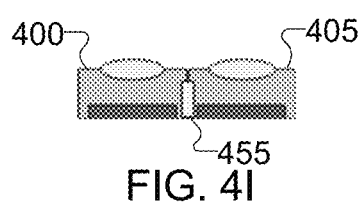
Figure 4J:
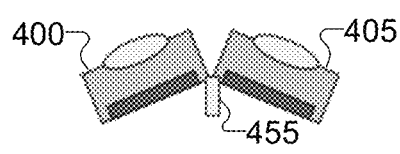

Note that the use of one or more actuators to push or pull one or more camera modules from the side is for illustration only and that other embodiments may be used. For example, as shown in FIGS. 4I and 4J, an actuator 455 can be positioned below the center of the movable camera modules 400, 405, where the actuator 455 pushes the modules upward or pulls the modules downward.

The actuator(s) 410, 430, 435, 455 here are used to provide a controllable amount of tilt to multiple camera modules. "Tilt" in this disclosure refers to movement (such as rotation and/or translation) that changes the optical axis of a camera. In some embodiments, larger displacements of the optical axes may be more desirable, such as to achieve larger baseline for better depth estimation. Another benefit of a device that uses tilted camera modules compared to a single camera that uses a wide field of view lens (with a shorter focal length) is that the overall imaging surface is no longer one plane but closer to the surface of a sphere. A planar image sensor with a short focal length has several problems, such as large geometric distortion, loss of focus sharpness towards corners, and lesser angular resolution (pixels per degree) compared to embodiments of this disclosure. Moreover, a short focal length lens typically has a fixed focus, limiting image clarity and making it very difficult to design to achieve adjustable focus.

The actuator(s) 410, 430, 435, 455 here can provide a dynamic tilting mechanism that provides the ability to use multiple camera modules in both the normal mode 300 as well as the pano mode 305. Additionally, since the camera modules may only be tilted during the pano mode 305, the device thickness during the normal mode can be very close to conventional cameras. This can be important for thickness-sensitive devices such as smartphones. Thus, in some embodiments as shown in FIG. 4G, the camera modules may normally point in the same direction, helping to keep the camera modules normally within a thickness profile 445 of the device. When the user desires to capture pano still or video images, the camera modules can be tilted outwards such that the camera modules are no longer within the thickness profile 445 of the device as shown in FIG. 4H. When the user is finished with the pano mode, the camera modules can be retracted back into the normal mode. As a result, a device thickness 450 can remain the same as or similar to current designs.

In cases of two-dimensional arrays of movable camera modules (such as in FIGS. 4E and 4F), the camera modules can be moved in horizontal and vertical directions to create overlap in both directions when in the pano mode. This may allow, among other things, multiple pano images to be captured with different offsets in order to digitally produce simulated lens effects in pano mode.

Although FIGS. 4A, 4B, 4C, 4D, 4E, 4F, 4G, 4H, 4I, and 4J illustrate examples of camera module movements, various changes may be made to these figures. For example, while camera modules are shown as being connected, separate actuators may be used to move individual camera modules or subsets of camera modules.

Figure 5A:
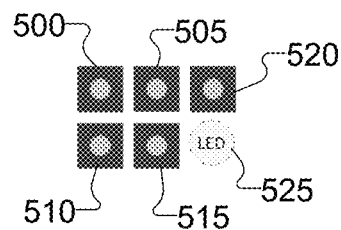
FIGS. 5A, 5B, 5C, 5D, 5E, 5F, and 5G illustrate example operating modes for a four-camera array in accordance with this disclosure.
Figure 5B:
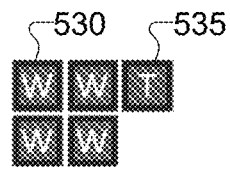
Figure 5C:
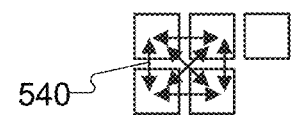

FIGS. 5A, 5B, 5C, 5D, 5E, 5F, and 5G illustrate example operating modes for a four-camera array in accordance with this disclosure. In particular, FIG. 5A illustrates a four-camera array with camera modules 500, 505, 510, 515, an additional camera module 520 (such as a telephoto camera), and an LED 525. FIG. 5B illustrates a four-camera with wide-angle camera modules 530 and an additional telephoto camera module 535, which may represent a particular implementation of the camera modules in FIG. 5A. FIG. 5C illustrates example motions 540 of either four-camera array. Two-dimensional configurations of array cameras allow for better use of baseline diversity (where lines joining optical axes of cameras span a plane). Here, wide-angle cameras are designated using "W", and telephoto cameras are designated using "T". One of the cameras in an array can be designated as the "main" or "reference" camera with respect to which other cameras in the array operate. One or more actuators can be used as described above to move the cameras in each array and achieve the identified motions in FIG. 5C.

FIGS. 5D, 5E, 5F, and 5G illustrate example views of the camera modules. In these figures, image frames 545, 550, 555, and 560 are associated with different camera modules 500, 505, 510, 515, respectively. For example, the image frame 545 corresponds to the camera module 500, the image frame 550 corresponds to the camera module 505, the image frame 555 corresponds to the camera module 510, and the image frame 555 corresponds to the camera module 515 in FIGS. 5D, 5E, 5F, and 5G. These image frames can be captured simultaneously.

Figure 5D:
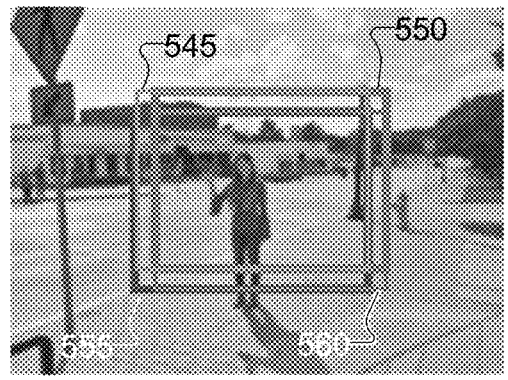
Figure 5E:
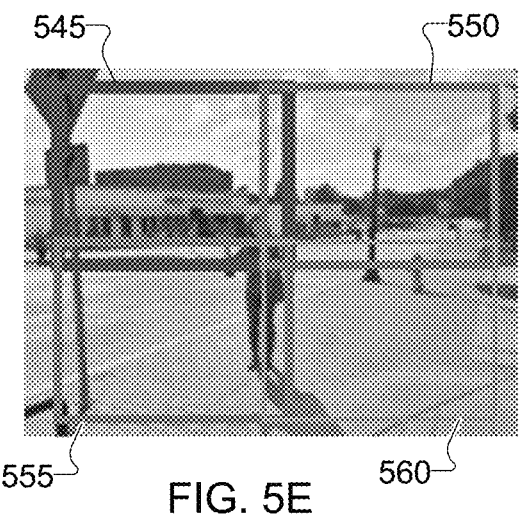
Figure 5F:
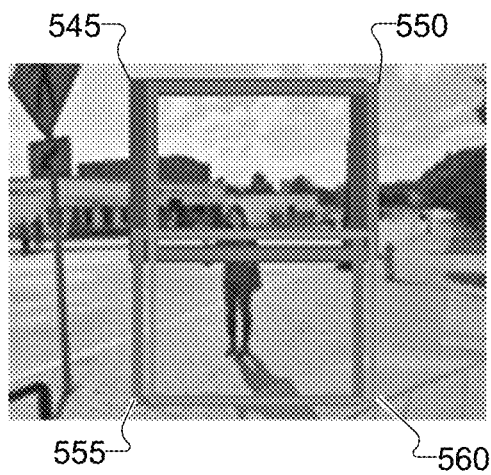
Figure 5G:
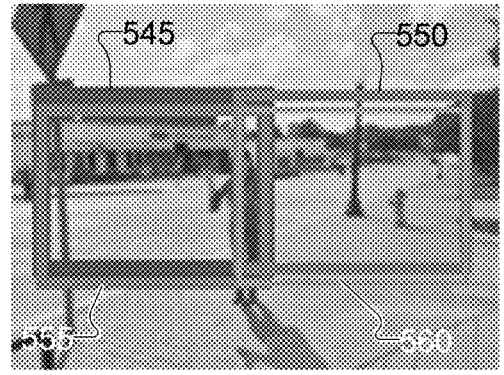

As shown in FIG. 5D, when in the normal mode, all camera modules 500-520 point in the same direction, so the fields of view of the camera modules 500-520 overlap (completely or substantially). As shown in FIG. 5E, when in a "full" pano mode, the camera modules 500-520 are tilted to a maximum extent in four different directions with small overlap between them. As shown in FIG. 5F, when in a "vertical" pano mode, two pairs of camera modules 500-520 are tilted to a maximum extent in two different directions vertically, with small overlap between the camera modules in different pairs. As shown in FIG. 5G, when in a "horizontal" pano mode, two pairs of camera modules 500-520 are tilted to a maximum extent in two different directions horizontally, with small overlap between the camera modules in different pairs. In all of these modes, an additional wide-angle camera (not illustrated) can be used to cover the entire field of view for all of the camera modules 500-520. Imaging processing can be used to combine the image data from multiple camera modules 500-520 in order to produce a desired image of a scene.

To create panoramic views, device makers typically require the user to move the camera in a particular way while capturing the picture, or are forced to use one large-megapixel sensor with a very short focal length lens to make an ultra-wide-angle camera. In contrast, it is possible to increase an overall resolution of generated images using the approaches here without having to use one large-megapixel sensor and without sacrificing pixel counts or device thicknesses. For example, four 32 MP camera modules in full pano mode may be used to create images greater than 100 MP (up to 128 MP). As described below, since different camera modules capture images with different fields of view and overlap between them, an application processor can employ one or more digital algorithms to generate final images of scenes. For instance, in the views in FIGS. 5F and 5G, the application processor can use two pairs of overlapping images to estimate depth and then generate a panoramic image having Bokeh (meaning the background of the image is blurred computationally). Additional features of this pano-Bokeh funtionality are provided below.

The motions 540 in FIG. 5C illustrate combinations of movements for a 4×4 array. For example, the wide-angle camera modules 530 can be tilted in the horizontal direction and/or vertical direction as described above. For example, when not being affected by the actuators 430 and 435, the wide-angle camera modules 530 may achieve the normal view shown in FIG. 5D. When both actuators 430 and 435 have been activated, the wide-angle camera modules 530 may achieve the full pano view shown in FIG. 5E. When one but not both actuators 430 and 435 has been activated, the wide-angle camera modules 530 may achieve the pano view shown in FIG. 5F or FIG. 5G.

Although FIGS. 5A, 5B, 5C, 5D, 5E, 5F, and 5G illustrate examples of operating modes for a four-camera array, various changes may be made to these figures. For example, four camera modules may be used in different ways to capture images of scenes.

Figure 6A:
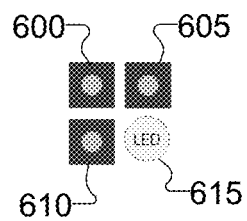
FIGS. 6A, 6B, 6C, and 6D illustrate example operating modes for a two-camera array in accordance with this disclosure.
Figure 6C:
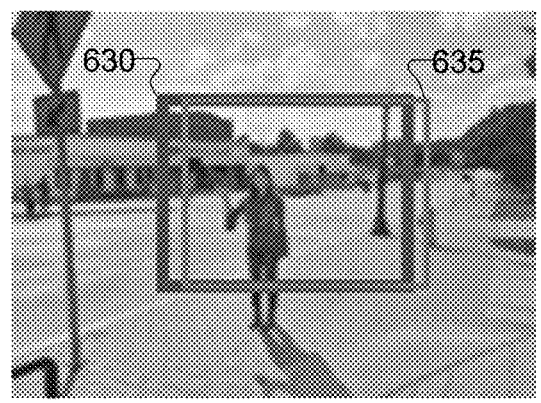
Figure 6B:
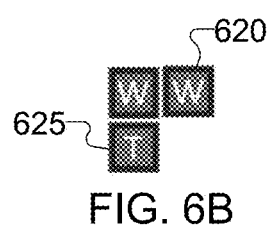
Figure 6D:
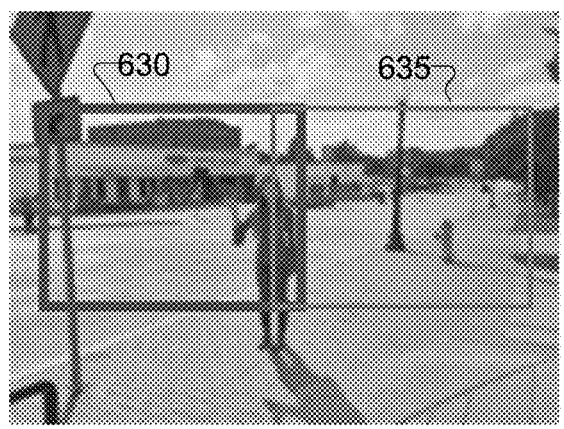

FIGS. 6A, 6B, 6C, and 6D illustrate example operating modes for a two-camera array in accordance with this disclosure. In particular, FIG. 6A illustrates an example two camera-array having camera modules 600, 605, an additional camera module 610 (such as a telephoto camera), and an LED 615. FIG. 6B illustrates an example two-camera array using two wide-angle camera modules 620 and an additional telephoto camera module 625, which may represent a particular implementation of the camera modules in FIG. 6A. FIG. 6C illustrates an example normal view mode, and FIG. 6D illustrates an example pano view mode. In FIGS. 6C and 6D, image frames 630, 635 are associated with different camera modules 600, 605, respectively. These image frames can be captured simultaneously.

As shown in FIG. 6C, when in the normal mode, both camera modules 600, 605 point in the same direction, so the fields of view of the camera modules 600, 605 overlap (completely or substantially). As shown in FIG. 6D, when in a "horizontal" pano mode, the camera modules 600, 605 are tilted to a maximum extent in two different directions horizontally, with small overlap between the camera modules. In both modes, an additional wide-angle camera (not illustrated) can be used to cover the entire field of view for the camera modules 600, 605. Imaging processing can be used to combine the image data from multiple camera modules 600, 605 in order to produce a desired image of a scene.

Although FIGS. 6A, 6B, 6C, and 6D illustrate examples of operating modes for a two-camera array, various changes may be made to these figures. For example, two camera modules may be used in different ways to capture images of scenes.

Figure 7A:
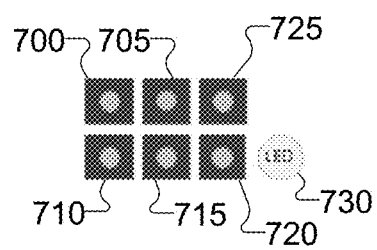
FIGS. 7A, 7B, and 7C illustrate an example operating mode for a five-camera array in accordance with this disclosure.
Figure 7B:
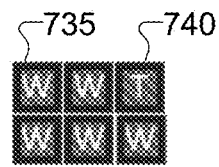
Figure 7C:
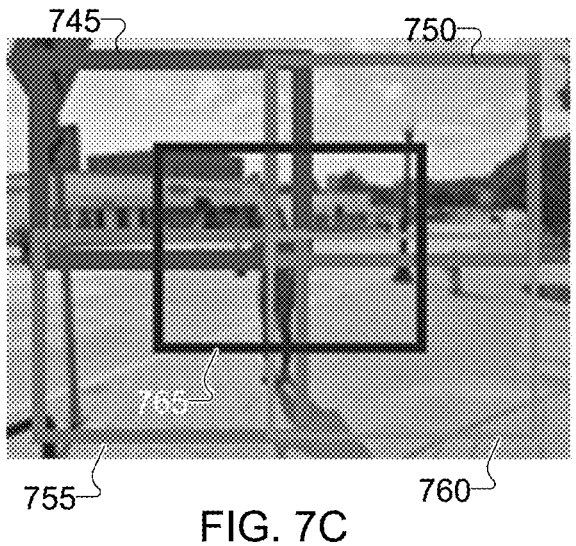

FIGS. 7A, 7B, and 7C illustrate an example operating mode for a five-camera array in accordance with this disclosure. In particular, FIG. 7A illustrates an example five-camera array having camera modules 700, 705, 710, 715, 720, an additional camera module 725, and an LED 730. FIG. 7B illustrates an example five-camera array using five wide-angle camera modules 735 with an additional telephoto camera module 740, which may represent a particular implementation of the camera modules in FIG. 7A. FIG. 7C illustrates an example full pano view mode, where image frames 745, 750, 755, 760, 765 are associated with different camera modules 700, 705, 710, 715, 720, respectively. These image frames can be captured simultaneously.

As shown in this example, when operating as shown in FIG. 7C, the images 745-760 slightly overlap, and the image 765 remains focused on the center of the scene. The image 765 can be used to provide greater detail at the center of a panoramic image and to provide enhanced clarity at stitched portions between the images 745-760. In some embodiment, the camera module 725 or 740 can be used in place of or in combination with the camera 720 to capture the image 765. The camera 720 could be independently tiltable to automatically determine the focus of the image. For example, the electronic device could determine that the focus of the image is slightly above the center of the pano view and tilt the camera 720 to focus upwards. In other embodiments, however, the camera 720 does not need to include the independent tilting functionality.

Although FIGS. 7A, 7B, and 7C illustrate one example of an operating mode for a five-camera array, various changes may be made to these figures. For example, five camera modules may be used in different ways to capture images of scenes.

FIGS. 8A, 8B, 8C, 8D, 8E, 8F, and 8G illustrate example camera arrays 800-806 in accordance with this disclosure. Here, FIG. 8A illustrates an example three-camera array 800, FIG. 8B illustrates an example four-camera array 801, FIG. 8C illustrates an example horizontal two-camera array 802, and FIG. 8D illustrates an example vertical two-camera array 803. Also, FIG. 8E illustrates an example three-camera array 804 with wide-angle camera modules and optional wide or telephoto camera modules, FIG. 8F illustrates an example three-camera array 805 with RGB camera modules and an optional RGB or monochrome camera module, and FIG. 8G illustrates an example three-camera array 806 with 12 megapixel camera modules and an optional 12 or 18 megapixel camera module.

In these examples, FIGS. 8A-8D illustrate different configurations for camera arrays. The camera arrays can include two or more of a first camera module 810, a second camera module 815, a third camera module 820, and a fourth camera module 825. The camera arrays can also include different type of camera modules, such as wide or telephoto cameras (FIG. 8E), RGB or monochrome camera modules (FIG. 8F), and differing megapixel camera modules (FIG. 8G). When camera modules of different types are used, the "main" camera module could be the chosen based on the type of camera module available, such as when the main camera module is designated as the 18 MP camera.

Although FIGS. 8A, 8B, 8C, 8D, 8E, 8F, and 8G illustrate examples of camera arrays 800-806, various changes may be made to these figures. For example, these configurations are merely meant to illustrate other example types of configurations that may be used in an electronic device.

Figure 9:
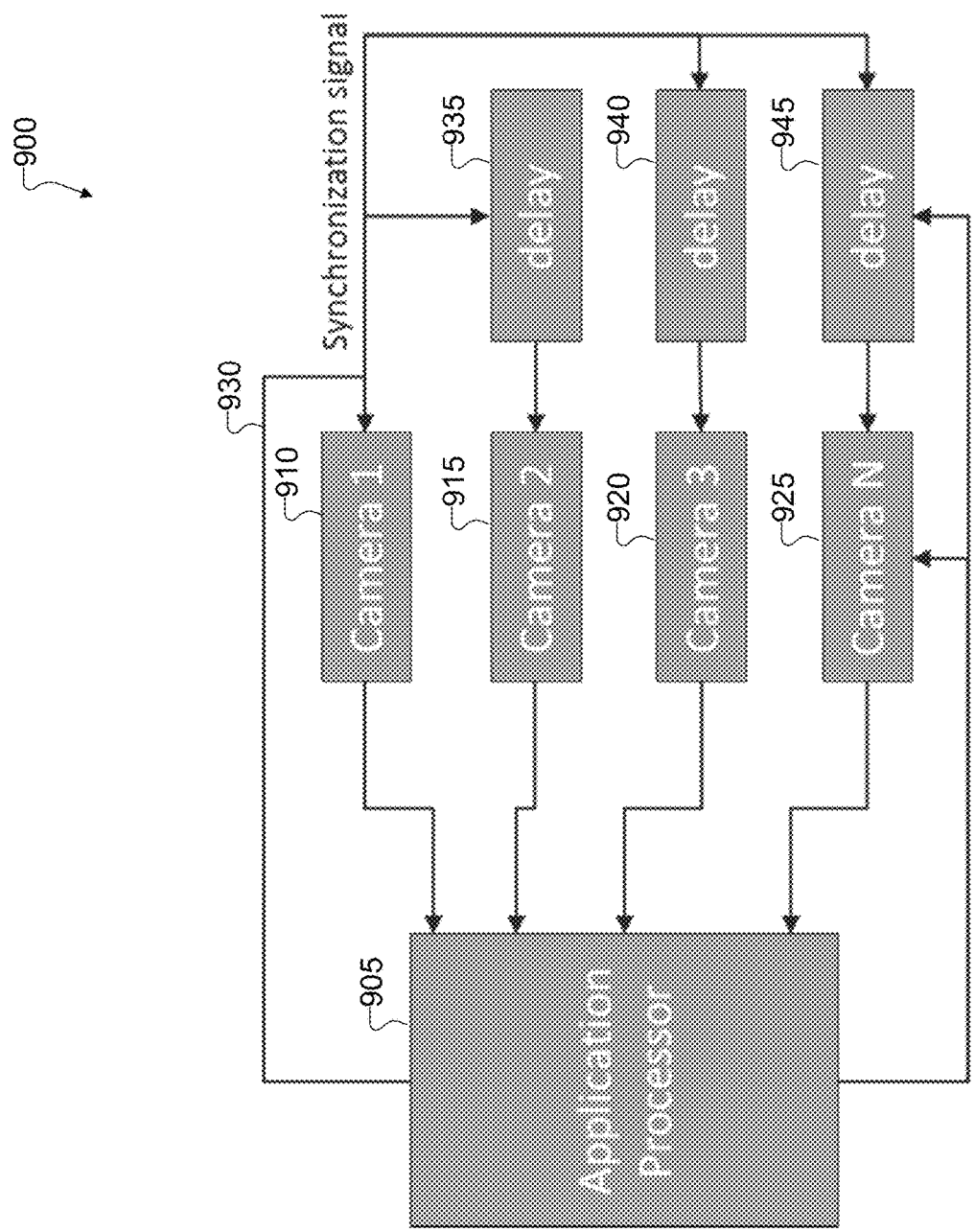
FIG. 9 illustrates an example synchronization of multiple cameras in accordance with this disclosure.

FIG. 9 illustrates an example synchronization 900 of multiple cameras in accordance with this disclosure. For ease of explanation, the synchronization 900 of multiple cameras may be described as being used with the electronic device 200 of FIG. 2, which could represent the electronic device 101 of FIG. 1. However, the synchronization of multiple cameras may be used with any suitable electronic device and in any suitable system.

As shown in FIG. 9, multiple camera modules 910-925 in an array can be connected with a central application processor (AP) 905 that controls and configures the individual camera modules. The camera modules 910-925 are synchronized by a common synchronization signal 930 (such as frame V-sync) that can be provided by the AP 905 or by one of the camera modules that is configured by the AP 905 to do so. The synchronization allows the camera modules 910-925 to capture time-synchronized image frames and to send the captured image frames the AP 905. This help to freeze motion between cameras. The AP 905 can store these frames in a buffer or process them right away in an "on the fly" fashion. Typically, the AP 905 has fewer image signal processing (ISP) circuits than the camera modules in the array. A memory frame buffer can be used to allow time-slicing of the AP's ISP between multiple camera modules, meaning the same ISP circuits can be used to process images from different camera modules at different times.

Programmable delay elements 935-945 can be inserted in the path of the synchronization signal 930 in order to delay receipt of the synchronization signal 930 at the camera modules 915-925. Using these delay elements 935-945, it is possible to operate the camera modules 910-925 with staggered frame captures, such as to enable high frame rate video recording. The delay elements 935-945 can also be bypassed or set to zero delay when the camera modules 910-925 are used to capture image frames simultaneously.

Although FIG. 9 illustrates one example of the synchronization 900 of multiple cameras, various changes may be made to FIG. 9. For example, while four camera modules are shown here, any other suitable number of camera modules may be used.

Figure 10:
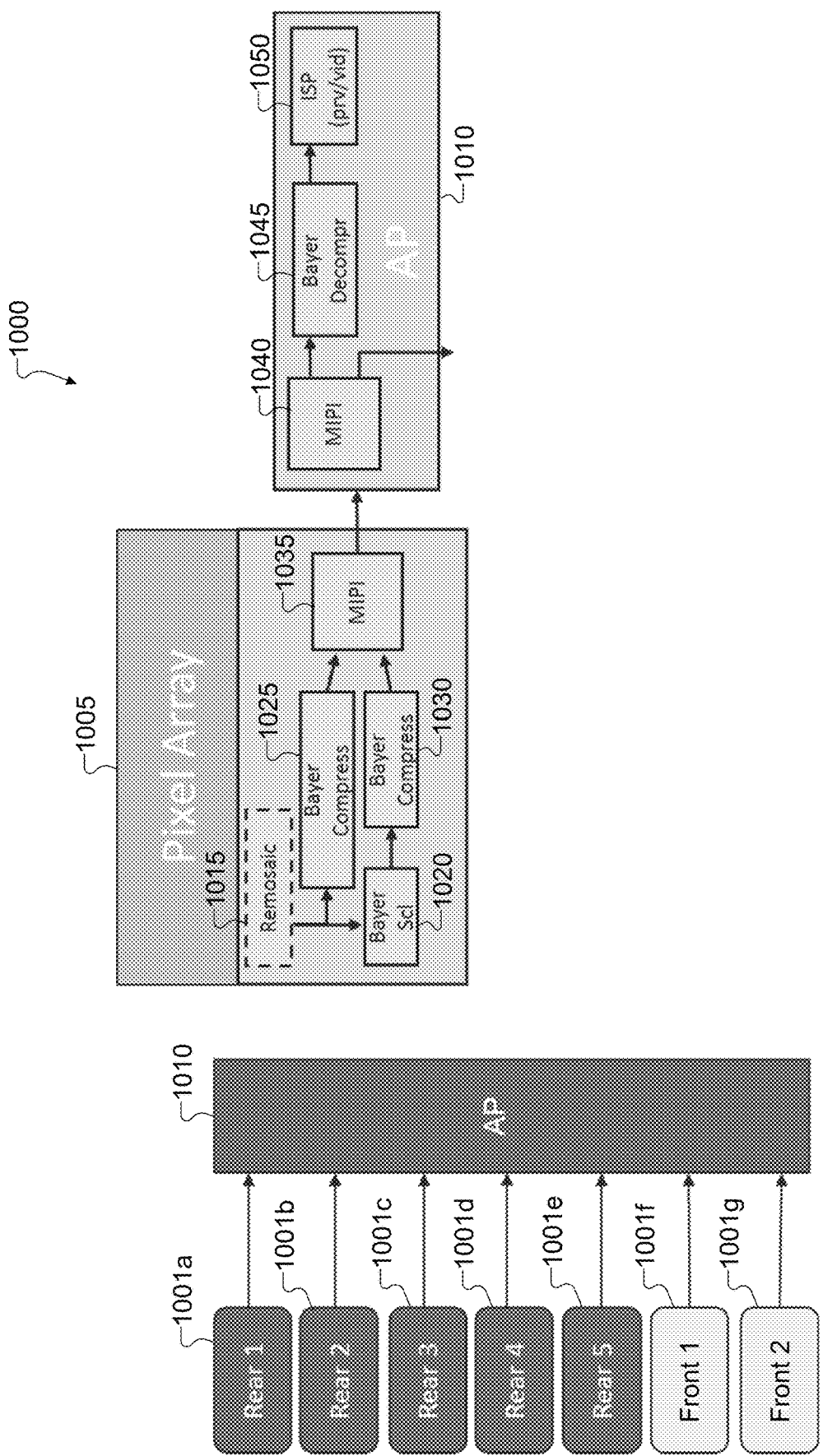
FIG. 10 illustrates an example sensor and application processor connectivity for power reduction in accordance with this disclosure.

FIG. 10 illustrates an example sensor and application processor connectivity 1000 for power reduction in accordance with this disclosure. For ease of explanation, the sensor and application processor connectivity 1000 may be described as being used with the electronic device 200 of FIG. 2, which could represent the electronic device 101 of FIG. 1. However, the sensor and application processor connectivity may be used with any suitable electronic device and in any suitable system.

As shown in FIG. 10, each pixel array 1005 in one of multiple cameras 1001a-1001g can transmit data to an application processor 1010 (which may represent the AP 905). In some embodiments, the architecture of the pixel array 1005 allows for use of a dual-stream sensor over camera serial interface (CSI) virtual channels. For example, a first stream can be generated at a preview resolution (such as 2 MP at thirty frames per second), and a second stream can be generated at full frame resolution (such as 30 MP at thirty frames per second). A third stream can be generated for a video scenario (such as 12 MP at 60 frames per second single stream) as an alternative to one or both of the first stream or second stream. Power can be reduced here due to the use of a dual-stream architecture, and the dual stream architecture allows for different resolutions and frame rates for preview versus still images. For instance, the second stream at the full frame resolution may have a lower frame rate than the first stream at the preview resolution.

As shown here, each of the camera modules 1001a-1001g includes a corresponding remosaic function 1015, a Bayer scaling (SCL) function 1020, at least two Bayer compression functions 1025, 1030, and an MIPI CSI transmit function 1035. Each camera module 1001a-1001g can capture a stream using the associated pixel array 1005. The remosaic function 1015 can convert an RGB array from the input captured by the camera module 1001a-1001g into an intensity array. The remosaic function 1015 outputs the converted stream to the Bayer compression function 1025 and the Bayer scaling function 1020.

The Bayer scaling function 1020 performs a scaling of the output of the remosaic function 1015. The Bayer scaling function 1020 can scale the converted stream into a preview stream, which is generated at or converted to a lower resolution than the full frame stream. The Bayer scaling function 1020 outputs the preview stream to the Bayer compression function 1030. The Bayer compression function 1025 compresses the output or the full frame stream directly from the remosaic function 1015, and the Bayer compression function 1030 compresses the scaled output or preview stream from the Bayer scaling function 1020. In some embodiments, each Bayer compression function 1025, 1030 can provide lossy compression up to 4 bpp, although typically 6-8 bpp is experienced. Also, in some embodiments, each Bayer compression function 1025, 1030 can provide a guaranteed fixed-rate compression. The Bayer compression functions 1025, 1030 can perform separate compressions on the full frame stream and the preview stream simultaneously.

The MIPI CSI transmit function 1035 converts the outputs from the Bayer compression functions 1025 and 1030 for output to an external component, such as the application processor 1010. In some embodiments, a MIPI CSI receive function 1040 can output the compressed preview stream and the compressed full frame stream to the application processor on separate virtual channels but over the same physical CSI interface channel.

The AP 1010 in this example includes the MIPI CSI receive function 1040, which receives information from the MIPI CSI transmit function 1035 and outputs the information to an external device and to a Bayer decompression function 1045 of the AP 1010. The Bayer decompression function 1045 processes the information for an ISP 1050 to decompress the information and to provide a preview or video of the information. The external output can send the compressed Bayer to storage for later processing or to any other suitable destination.

Although FIG. 10 illustrates one example of a sensor and application processor connectivity 1000 for power reduction, various changes may be made to FIG. 10. For example, pixel arrays and application processors may be implemented in any other suitable manner. Also, while described as processing image data in the Bayer domain, note that image data in any other suitable domain can be used here. Thus, the Bayer scaling function 1020, Bayer compression functions 1025, 1030, and Bayer decompression function 1045 can be replaced with other suitable scaling, compression, and decompression functions.

Figure 11:
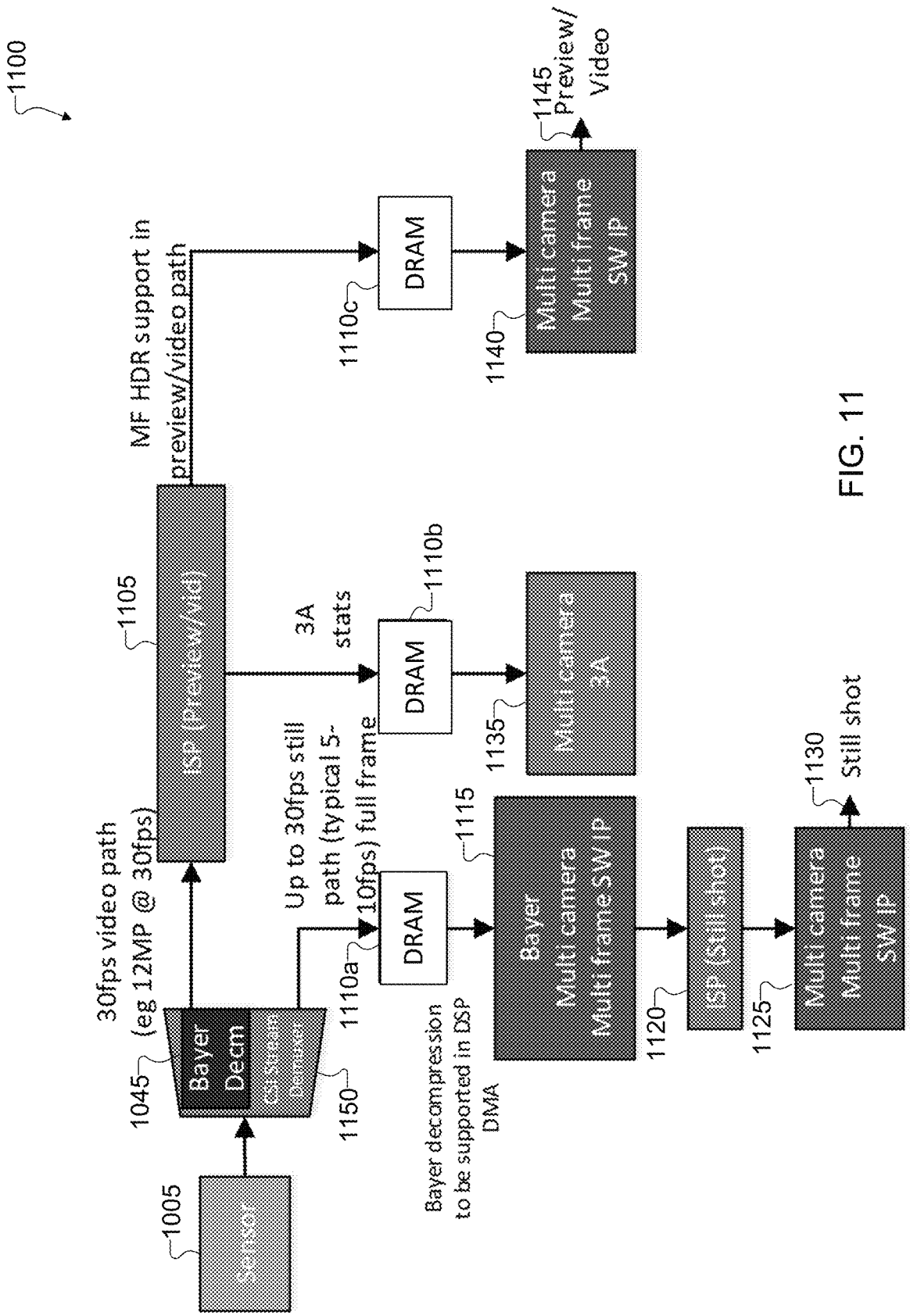
FIG. 11 illustrates an example data flow for an image signal processor and dynamic random access memory (DRAM) bandwidth in accordance with this disclosure.

FIG. 11 illustrates an example data flow 1100 for an image signal processor and dynamic random access memory (DRAM) bandwidth in accordance with this disclosure. For ease of explanation, the data flow 1100 may be described as being used with the electronic device 200 of FIG. 2A, which could represent the electronic device 101 of FIG. 1. However, the data flow 1100 may be used with any suitable electronic device and in any suitable system.

As shown in FIG. 11, the data flow 1100 begins at a sensor (the pixel array 1005 described above), which generates one or more images and transmits the image(s) to the AP 1010. For simplicity, the MIPI CSI transmit and receive functions 1035 and 1040 are not shown in FIG. 11. Although one pixel array 1005 is illustrated in FIG. 11, all cameras may output generated images to the AP 1010. Also, all cameras can operate simultaneously to provide images for generation of a time-consistent panoramic image. In some embodiments, the MIPI CSI receiver's virtual channel demultiplexer function 1150 can demultiplex and output two virtual streams (preview/video stream and still image/frame stream) from the single physical channel between the pixel array 1005 and the AP 1010.

The Bayer decompression function 1045 can decompress the preview or video stream that was earlier compressed in the sensor 1005 by the Bayer decompression function 1030 to a thirty frames per second video path (such as 12 MP at thirty frames per second) that is sent to an image signal processor (ISP) 1105. The demultiplexer 1150 can also generate a thirty frames per second still path full frame, where a typical still path is generated at five to ten frames per second. This output is sent to a Bayer DRAM storage 1110a to await further processing. The ISP 1105 can process the video feed from the AP 1010 into a preview stream and a video stream. A 3 A output (auto-focus, auto-exposure, auto-white-balance) from the ISP 1105 can be sent to a 3 A DRAM storage 1110b. The ISP 1105 can also process the video feed into a multi-frame (MF) HDR output and send the MF HDR output to a MF DRAM storage 1110c. The preview/video stream can be processed on-the-fly for a lower power and lower latency result. While 3 A processing is indicated on a separate path, the preview/video path and the still path are also able to run 3 A processing, face detection, or other functions.

A DRAM storage 1110 (DRAM storage 1110a, DRAM storage 1110b, and DRAM storage 1110c) includes one or more DRAM memories. The DRAM storage 1110 operates as a buffer for image or video data captured by the pixel array 1005 and subsequently processed by the AP 1010. The DRAM storages 1110a-1110c can operate as a single unit that is partitioned into separate buffers or as separate units based on the inputs received. The still stream can be processed memory-to-memory with Bayer pre-processing as well as YUV post-processing. The still stream can be full resolution but typically not at thirty frames per second to reduce power dependency. Although not typically at thirty frames per second, the DRAM storage 1110a can support full thirty frames per second bandwidth (peak bandwidth).

The information in the DRAM storage 1110a is read by a Bayer multi-camera, multi-frame image processor 1115 and further processed by a still shot ISP 1120 and a multi-camera, multi-frame image processor 1125 and output as a still shot 1130. The information in the DRAM storage 1110b is read by a multi-camera 3 A function 1135 and stored internally. The information in the DRAM storage 1110c is read by a multi-camera, multi-frame image processor 1140 and output as a preview/video image 1145. Depending on the scenario, the preview/video stream can be processed up to 12 MP at thirty frames per second (at a minimum operation using two cameras) or up to 4 MP at thirty frames per second (at a maximum operation using all 5 cameras).

Although FIG. 11 illustrates one example of a data flow 1100 for an image signal processor and DRAM bandwidth, various changes may be made to FIG. 11. For example, image data may be processed in any other suitable manner.

Figure 12:
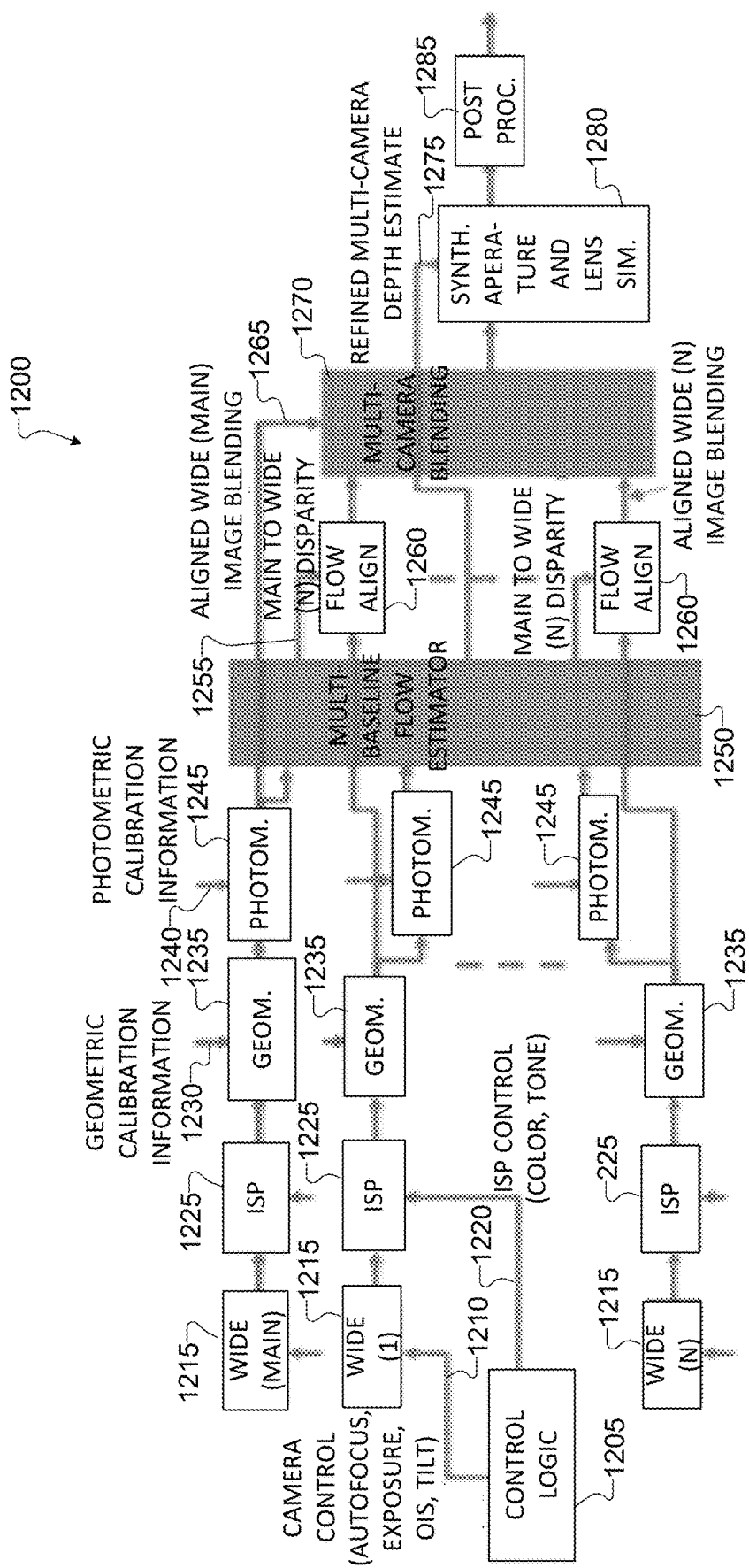
FIG. 12 illustrates an example normal mode processing pipeline for a camera array in accordance with this disclosure.
Figure 13:
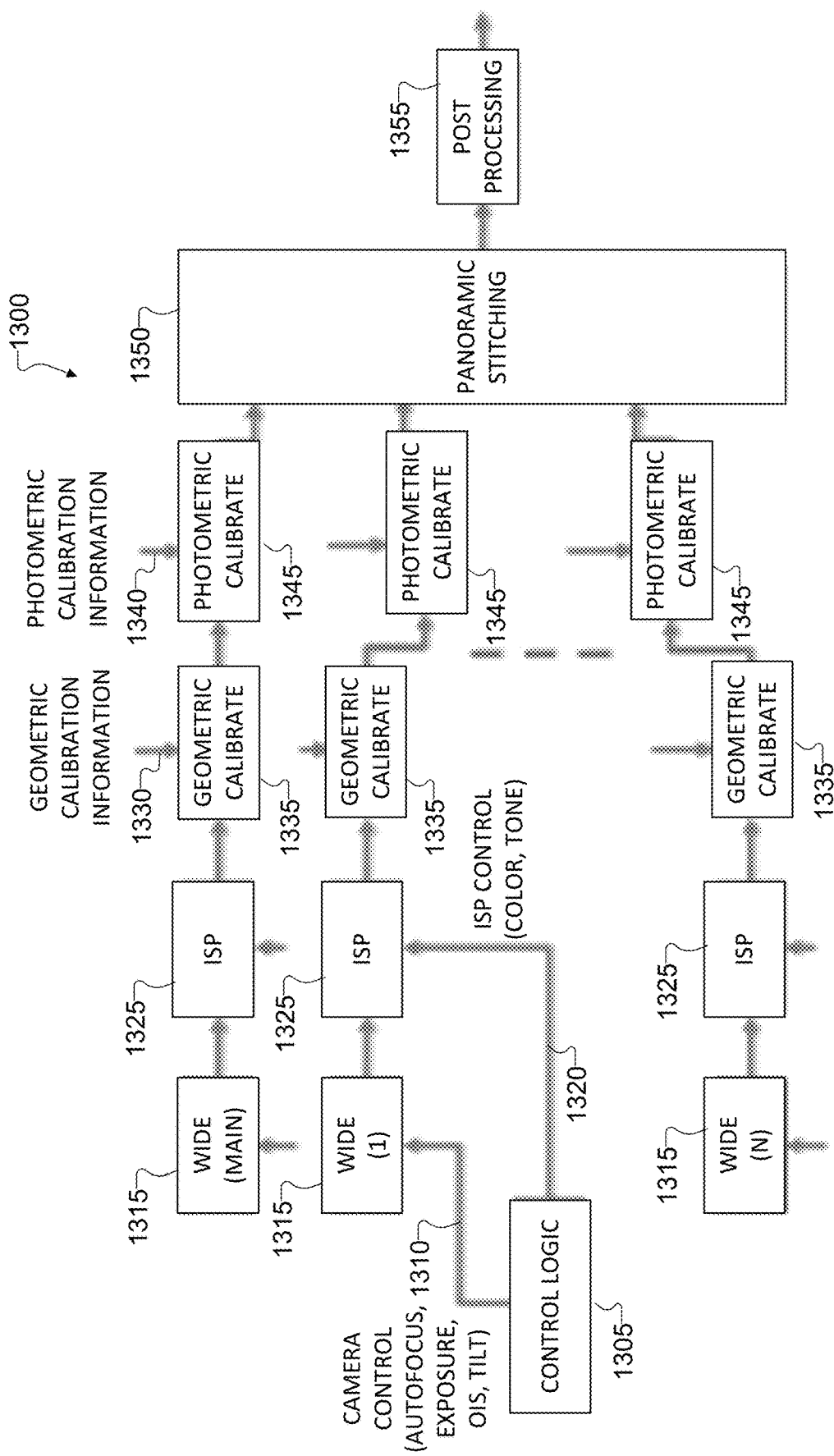
FIG. 13 illustrates an example pano mode processing pipeline for a camera array in accordance with this disclosure.

FIG. 12 illustrates an example normal mode processing pipeline 1200 for a camera array in accordance with this disclosure, and FIG. 13 illustrates an example pano mode processing pipeline 1300 for a camera array in accordance with this disclosure. For ease of explanation, the processing pipelines 1200, 1300 may be described as being used with the electronic device 200 of FIG. 2, which could represent the electronic device 101 of FIG. 1. However, the processing pipelines 1200, 1300 may be used with any suitable electronic device and in any suitable system.

As described above, an array camera can be used for typical camera use cases, such as still photography and video photography, while also providing preview images on a device's display. To conserve system power, all cameras need not be active for preview and video. For example, for preview photo or video recording in normal mode, only two cameras with overlapping fields of view may need to be active. In cases where zooming is used during preview photo or video recording, only the telephoto camera and one wide-angle camera need to be active. While preview is on, both active and non-active camera modules may be sending full resolution frame buffers into memory to provide "zero shutter lag" capability. Thus, once the AP 905 receives a capture command, the AP 905 can process the frames in memory for multiple active/non-active cameras to generate an output. Similarly, all cameras need not be "booted up" or started at the same time, which reduces camera startup times.

In some embodiments, once the AP 905 receives a command to start, it can decide to boot up the camera in one of several modes. For example, the AP 905 can decide to boot up in the normal mode 300, in which case the AP 905 can boot up the main wide-angle camera first followed by additional wide-angle cameras. The main camera can provide a single-camera preview, and only single camera-based lens blur effects can be enabled until a second wide-angle camera can turn on, after which multi-camera lens blur effects can be enabled in preview. Thereafter, additional wide-angle cameras can be booted up whose frames can populate the memory buffer but need not be used for generation of preview or video recording. The AP 905 may also decide to boot up in one of the "pano" modes, such as horizontal pano, vertical pano, or full pano. In such a case, the AP 905 can boot up a minimum number of wide-angle cameras and control one or more actuators to achieve the desired field and view, and then additional cameras can be enabled as needed.

Each processing pipeline 1200, 1300 can use calibration information stored in system memory to be able to process images from multiple cameras. The calibration information can include calibration for camera optics (such as geometric distortion or vignetting), photometric differences (such as brightness and color), pose calibration (relative position and orientation of the various cameras that can have small tolerances due to manufacturing), camera intrinsic parameters (focal length), and parameters for auto focus and optical image stabilization (OIS). Each processing pipeline 1200, 1300 can also run online calibration adjustment to continuously calculate adjustment of calibration parameters from dynamic scenes.

As shown in FIG. 12, control logic 1205 can control the processing of frames captured from each of the cameras (denoted MAIN, 1, ..., N). The control logic 1205 can provide camera control features 1210 to each of multiple wide-angle processors 1215 for performing autofocus, exposure, OIS, tilt, etc. on the frames captured by a specific associated camera. In some embodiments, the wide-angle processors 1215 can include one or more processors that run in parallel, and frames processed by the wide-angle processors 1215 are output to multiple ISPs 1225. The control logic 1205 can also provide ISP control features 1220 to the ISPs 1225 for performing color or tone processing on the frames. The ISPs 1225 output processed frames to geometric calibration functions 1235. The control logic 1205 can further provide geometric calibration information 1230 to the geometric calibration functions 1235 for performing geometric alignment processing on the frames.

The geometric calibration functions 1235 output processed frames to photometric calibration functions 1245 and to a flow alignment function 1260. The control logic 1205 can provide photometric calibration information to the photometric calibration functions 1245 for performing photometric processing on the frames. The photometric calibration functions 1245 output processed frames to a multi-baseline flow estimator 1250. The photometric calibration function 1245 on the MAIN flow path also outputs the processed frames to a multi-camera blending operation 1270 via a path 1265.

The multi-baseline flow estimator 1250 can receive processed frames from the respective photometric calibration functions 1245. The multi-baseline flow estimator 1250 can determine positions and orientations of the respective processed images and objects within the images. The determined positions and orientations can be in relation to a MAIN frame or other previously-processed frame(s). The multi-baseline flow estimator 1250 outputs a MAIN to WIDE disparity 1255 for each respective flow (1, N) to a respective flow alignment function 1260. The multi-baseline flow estimator 1250 also outputs a refined multi-camera depth estimate 1275 to a synthetic aperture and lens simulation function 1280.

The flow alignment function 1260 receives the geometric calibration information and the positions and orientations based on the photometric calibration functions 1245. The flow alignment function 1260 aligns the respective frames in relation to the MAIN frame. The flow alignment function 1260 can output aligned images from the flows with the respective positioning information in relation to the MAIN frame to the multi-camera blending operation 1270.

The multi-camera blending operation 1270 can position the MAIN frame in a reference position. The multi-camera blending operation 1270 can also proceed through the different flow align outputs in order of the flow (1, ..., N) and stitch the full output image. The synthetic aperture and lens simulation function 1280 can process the blended frame from the multi-camera blending operation 1270 using the refined multi-camera depth estimate 1275. The output from the synthetic aperture and lens simulation 1280 can be further post-processed 1285 before being output to a display or other destination.

As shown in FIG. 13, components 1305-1345 can function in the same or similar manner as the components 1205-1045 in FIG. 12. The exception is that the geometric calibration functions 1335 only provide output to the photometric calibration functions 1345 and the photometric calibration functions 1345 only provide output to a panoramic stitching function 1350. Once the geometric calibration information and the photometric calibration information are processed into the respective frames, the outputs are stitched together by the panoramic stitching function 1350 into a panoramic frame. The panoramic frame can be further post-processed 1355 before being output to a display or other destination.

Although FIG. 12 illustrates one example of a normal mode processing pipeline 1200 for a camera array and FIG. 13 illustrates one example of a pano mode processing pipeline 1300 for a camera array, various changes may be made to FIGS. 12 and 13. For example, image frames captured using multiple camera modules can be processed in any other suitable manner.

It should be noted that the various operations and functions described above can be implemented in an electronic device 101 in any suitable manner. For example, in some embodiments, the operations and functions can be implemented or supported using one or more software applications or other software instructions that are executed by the processor 120 of the electronic device 101. In other embodiments, at least some of the operations and functions can be implemented or supported using dedicated hardware components. In general, the operations and functions can be performed using any suitable hardware or any suitable combination of hardware and software/firmware instructions.

Figure 14:
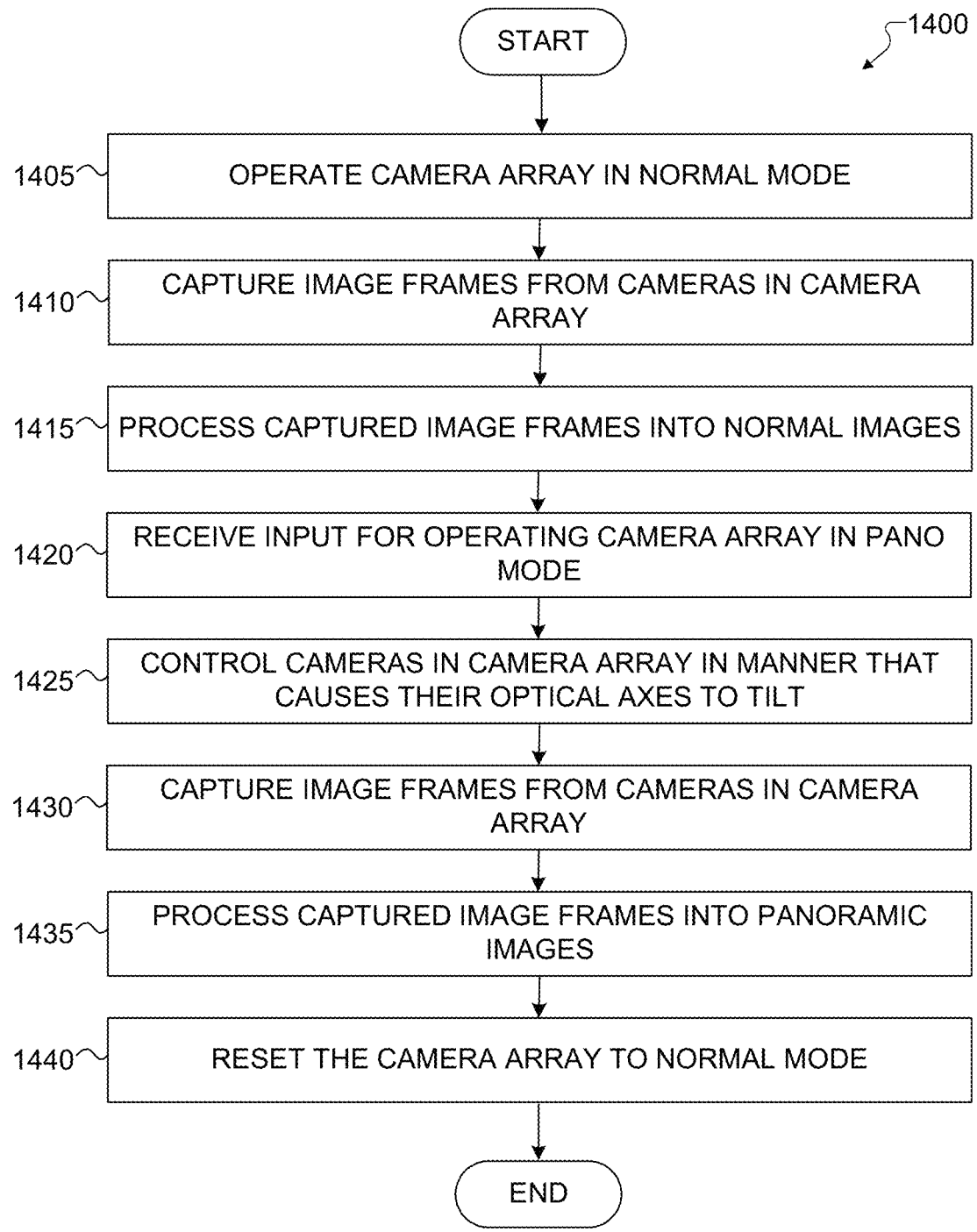
FIG. 14 illustrates an example method for operating multiple cameras for digital photography in accordance with this disclosure.

FIG. 14 illustrates an example method 1400 for operating multiple cameras for digital photography in accordance with this disclosure. For ease of explanation, the method 1400 shown in FIG. 14 is described as being performed using the electronic device 101 shown in FIG. 1. However, the method 1400 shown in FIG. 14 could be used with any other suitable electronic device and in any suitable system.

In operation 1405, the electronic device 101 operates a camera array in a normal mode. This may include, for example, the processor 120 maintaining cameras in the camera array in (or returning the cameras in the camera array to) a position where their optical axes are substantially perpendicular to a surface of the electronic device 101 or are otherwise substantially parallel to each other. During this time, the cameras are generally within a thickness profile of the electronic device 101. In operation 1410, the electronic device 101 may capture image frames from the cameras in the camera array. This may include, for example, the processor 120 receiving and processing image frames having substantially similar fields of view. In operation 1415, the electronic device 101 may process the image frames into one or more images. This may include, for example, the processor 120 processing the image frames to produce standard (non-panoramic) images of a scene.

In operation 1420, the electronic device 101 receives an input for operating the camera array in a pano mode. This may include, for example, the processor 120 receiving a command to operate in the pano mode when the electronic device 101 is in the normal mode. In operation 1425, the electronic device 101 controls the cameras in the camera array in a manner that causes their optical axes to tilt. This may include, for example, the processor 120 controlling one or more actuators to cause the cameras to tilt away from or towards each other. As a result, the optical axes of the cameras are no longer substantially perpendicular to the surface of the electronic device 101 or are otherwise no longer substantially parallel to each other. This also causes at least part of the cameras to "pop out" from the thickness profile of the electronic device 101. In operation 1430, the electronic device 101 captures image frames from the cameras in the camera array. This may include, for example, the processor 120 receiving and processing image frames having different fields of view. In operation 1435, the electronic device 101 processes the image frames into one or more panoramic images. This may include, for example, the processor 120 stitching the image frames together to produce the panoramic image. This may optionally include the processor 120 using depth information from pairs of image frames to provide Bokeh effects or to perform other operations.

In operation 1440, the electronic device 101 resets the camera array to normal mode. Here, once one or more images are captured or a video is completed, the electronic device 101 can cause the cameras to tilt back to where their optical axes are substantially perpendicular with the surface of the electronic device 101 or are otherwise substantially parallel to each other.

Although FIG. 14 illustrates one example of a method 1400 for operating multiple cameras for digital photography, various changes may be made to FIG. 14. For example, while shown as a series of steps, various steps in FIG. 14 may overlap, occur in parallel, occur in a different order, or occur any number of times.

Figure 15A:
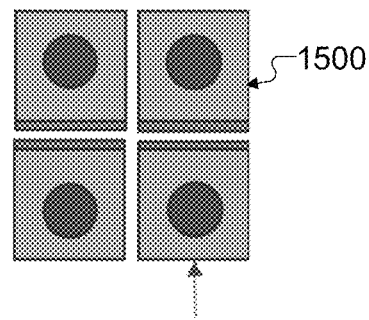
FIGS. 15A, 15B, and 15C illustrate example pano-Bokeh mode operations in accordance with this disclosure.
Figure 15B:
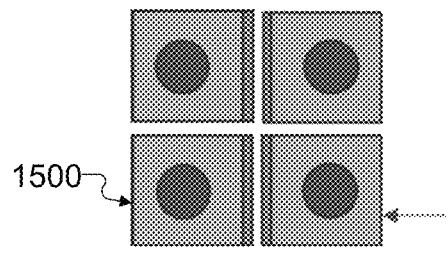
Figure 15C:
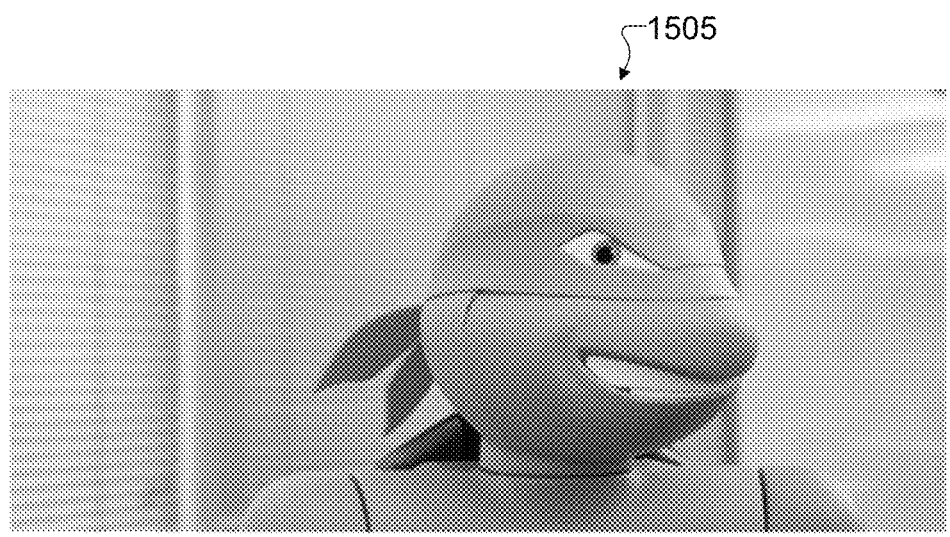

FIGS. 15A, 15B, and 15C illustrate example pano-Bokeh mode operations in accordance with this disclosure. For ease of explanation, the operations shown in FIGS. 15A, 15B, and 15C may be described as being used with the electronic device 200 of FIG. 2A, which could represent the electronic device 101 of FIG. 1. However, the operations shown in FIGS. 15A, 15B, and 15C may be used with any suitable electronic device and in any suitable system.

As described above, one possible use of the electronic device 200 is for capturing "pano-Bokeh" images of a scene, meaning panoramic images of the scene in which the background of the scene has been computationally blurred to provide the Bokeh effect. As shown in FIGS. 15A and 15B, at least four camera modules 1500 are used to provide this functionality. The camera modules 1500 can be placed in any suitable arrangement, such as in a 2×2 array. Also, the camera modules 1500 are used in pairs, meaning at least two pairs of camera modules 1500 are used to generate pano-Bokeh images. The camera modules 1500 in each pair are pointed in the same general direction, which allows the electronic device 200 to identify depth in different portions of a scene (which is used to produce the Bokeh effect). Different pairs of camera modules 1500 are pointed in opposite or different directions, which allows the electronic device 200 to capture image data over a wider angle (which is used to produce panoramic images).

Note that the pairs of camera modules 1500 in FIG. 15A are pointed up and down, while the pairs of camera modules 1500 in FIG. 15B are pointed left and right. The configuration shown in FIG. 15A may be useful in capturing vertical pano-Bokeh images, meaning the images are much taller than they are wide. In contrast, the configuration shown in FIG. 15B may be useful in capturing horizontal pano-Bokeh images, meaning the images are much wider than they are tall. However, note that this is based on the orientations shown in FIGS. 15A and 15B. Since the electronic device 200 is often easily rotated by a user, there is no requirement that the configuration in FIG. 15A only be used to capture vertical pano-Bokeh images or that the configuration in FIG. 15B only be used to capture horizontal pano-Bokeh images.

The camera modules 1500 in FIGS. 15A and 15B can operate similar to those shown in FIGS. 4C and 4D. That is, the camera modules 1500 can be moved using one or more actuators between a normal mode in which all camera modules 1500 are pointing in the same direction (helping to keep the camera modules normally within a thickness profile of the device 200) and at least one pano-Bokeh mode in which different pairs of camera modules 1500 are pointing in different directions. Depending on the electronic device 200, the camera modules 1500 may be pointed in different ways to support different pano-Bokeh modes, such as horizontal pano-Bokeh mode, vertical pano-Bokeh mode, and full pano-Bokeh mode. In some embodiments, multiple camera modules 1500 (and possibly all camera modules 1500) may be coupled together, such as via hinges, so that the camera modules 1500 move together when switching between modes. In other embodiments, each camera module 1500 may have its own associated actuator used to reposition that camera module 1500.

FIG. 15C illustrates an example pano-Bokeh image 1505 that may be produced using the camera modules 1500 in the configuration shown in FIG. 15B (meaning a horizontal pano-Bokeh image). As can be seen here, the image 1505 is panoramic in that it is wider than a standard image. Moreover, a subject in the image 1505 remains sharp, while a background of the image 1505 has been computationally blurred to provide the Bokeh effect. This can be achieved since pairs of camera modules 1500 can be used by the electronic device 200 to identify depth in the scene, allowing the electronic device 200 to produce blur in portions of the image 1505 associated with the background of the scene (which are associated with larger depths).

Although FIGS. 15A, 15B, and 15C illustrate examples of pano-Bokeh mode operations, various changes may be made to FIGS. 15A, 15B, and 15C. For example, pano-Bokeh images may be generated using other numbers of camera modules. Also, the image shown in FIG. 15C is for illustration only and is merely meant to illustrate one example of the type of Bokeh effect that can be created in a panoramic image.

It should be noted here that while camera modules are often described above as being tilted outward to support various operations, other embodiments can be used that tilt camera modules in other ways. For example, any of the embodiments described above may also or alternatively support the inward tilting of camera modules in order to support various operations.

Figure 16A:
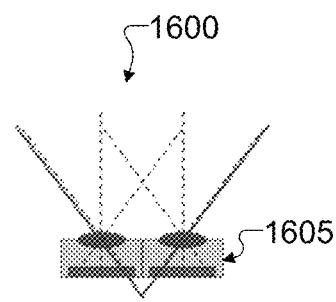
FIGS. 16A, 16B, 16C, 16D, 16E, and 16F illustrate an example camera array that can be tilted inwards in accordance with this disclosure.
Figure 16B:
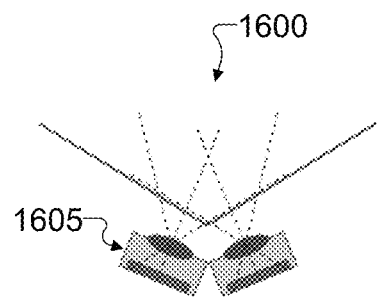

FIGS. 16A, 16B, 16C, 16D, 16E, and 16F illustrate an example camera array 1600 that can be tilted inwards in accordance with this disclosure. As shown in FIGS. 16A and 16B, the camera array 1600 includes multiple camera modules 1605. In this example, there are two camera modules 1605, although more than two camera modules 1605 may also be used here. As can be seen in FIG. 16A, the camera modules 1605 in a normal mode may normally have fields of view that overlap quite a bit. As can be seen in FIG. 16B, the camera modules 1605 in a pano mode may have fields of view that overlap only to a small extent. As described above, this allows the electronic device 200 to generate panoramic images by combining multiple images captured at the same time, rather than requiring a user to physically move the electronic device 200.

Figure 16C:
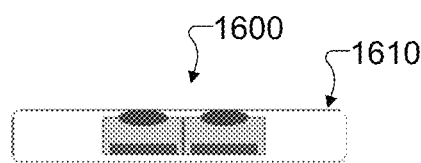
Figure 16D:
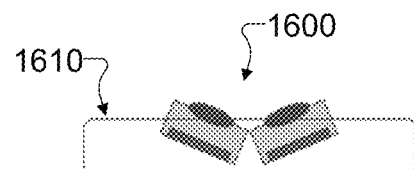

In FIGS. 16A and 16C, the camera modules 1605 may normally point in the same direction, helping to keep the camera modules 1605 normally within a thickness profile 1610 of an electronic device 200. In FIGS. 16B and 16D, when the user desires to capture pano still or video images, the camera modules 1605 can be tilted inwards such that the camera modules are no longer within the thickness profile 1610 of the device. When the user is finished with the pano mode, the camera modules 1605 can be retracted back into the normal mode. As a result, a device thickness 1610 can remain the same as or similar to current designs.

Figure 16E:
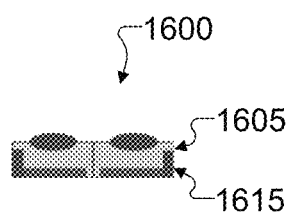
Figure 16F:
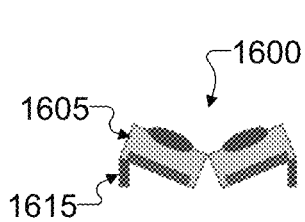

As shown in FIGS. 16E and 16F, one or more actuators 1615 can be used to move the camera modules 1605 between the different modes. In this example, two actuators 1615 are used to push the outer edges of the camera modules 1605 upwards. However, other arrangements of one or more actuators 1615 may be used here to provide the desired movements to the camera modules 1605. In some embodiments, the actuators 1615 only have two usable positions (normal and wide), and intermediate positions defined by transitory movement of the actuators 1615 are not used for image capture. In other embodiments, the actuated fields of view can be adjustable (such as in steps or continuously) between the normal view and the widest view, and various intermediate positions can be selected and used for image capture. In some embodiments, the camera modules 1605 are coupled by one or more hinges or other mechanical couplings in order to support the collective movement of the camera modules 1605.

Although FIGS. 16A, 16B, 16C, 16D, 16E, and 16F illustrate one example of a camera array 1600 that can be tilted inwards, various changes may be made to FIGS. 16A, 16B, 16C, 16D, 16E, and 16F. For example, while camera modules are shown as being connected, separate actuators may be used to move individual camera modules or subsets of camera modules.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   actuating at least one actuator in a direction substantially parallel to a surface of an electronic device to change first and second tiltable image sensor modules of an image sensor array of the electronic device between a first mode and a second mode, wherein:
   in the first mode, the first and second tiltable image sensor modules are positioned so that (i) a first optical axis of the first tiltable image sensor module and a second optical axis of the second tiltable image sensor module are substantially perpendicular to the surface of the electronic device and (ii) the first and second tiltable image sensor modules are within a thickness profile of the electronic device; and
   in the second mode, the first and second tiltable image sensor modules are tilted so that (i) the first optical axis of the first tiltable image sensor module and the second optical axis of the second tiltable image sensor module are not perpendicular to the surface of the electronic device and (ii) at least part of the first and second tiltable image sensor modules are no longer within the thickness profile of the electronic device;
   wherein the first tiltable image sensor module is hingedly connected to the second tiltable image sensor module.

2. The method of claim 1, further comprising, when configured in the second mode:
   capturing image frames of a scene using the first and second tiltable image sensor modules; and
   combining the image frames to produce a panoramic image of the scene.

3. The method of claim 1, wherein activating the at least one actuator comprises activating multiple actuators.

4. The method of claim 1, wherein the image sensor array is arranged linearly in a horizontal or vertical direction.

5. The method of claim 1, wherein:
   the image sensor array further includes a third tiltable image sensor module and a fourth tiltable image sensor module; and
   the image sensor array is arranged in a square pattern.

6. The method of claim 5, wherein:
   each of the first, second, third, and fourth tiltable image sensor modules is tiltable in horizontal and vertical directions; and
   in the second mode, the first, second, third, and fourth tiltable image sensor modules are tilted in different directions.

7. The method of claim 5, wherein, in the second mode:
   a first pair of the tiltable image sensor modules are tilted in one direction; and
   a second pair of the tiltable image sensor modules are tilted in an opposite direction.

8. The method of claim 7, further comprising:
   capturing image frames of a scene using the tiltable image sensor modules;
   combining the image frames to produce a panoramic image of the scene; and
   blurring a background of the scene in the panoramic image based on depths identified using different pairs of the image frames.

9. An electronic device comprising:
   an image sensor array comprising a first tiltable image sensor module hingedly connected to a second tiltable image sensor module, wherein:
   the image sensor array is configured to operate in a first mode in which (i) a first optical axis of the first tiltable image sensor module and a second optical axis of the second tiltable image sensor module are substantially perpendicular to a surface of the electronic device and (ii) the first and second tiltable image sensor modules are within a thickness profile of the electronic device; and
   the image sensor array is also configured to operate in a second mode in which (i) the first optical axis of the first tiltable image sensor module and the second optical axis of the second tiltable image sensor module are not perpendicular to the surface of the electronic device and (ii) at least part of the first and second tiltable image sensor modules are no longer within the thickness profile of the electronic device;
   at least one actuator configured to actuate in a direction substantially parallel to the surface of the electronic device to change the first and second tiltable image sensor modules between the first mode and the second mode; and at least one processing device operatively coupled to the image sensor array, the at least one processing device configured to control a tilting of the first and second tiltable image sensor modules between the first mode and the second mode.

10. The electronic device of claim 9, wherein, when the image sensor array is configured in the second mode, the at least one processing device is further configured to:

capture image frames of a scene using the first and second tiltable image sensor modules; and combine the image frames to produce a panoramic image of the scene.

11. The electronic device of claim 9, wherein the at least one actuator comprises multiple actuators.

12. The electronic device of claim 9, wherein the image sensor array is arranged linearly in a horizontal or vertical direction.

13. The electronic device of claim 9, wherein:

the image sensor array further includes a third tiltable image sensor module and a fourth tiltable image sensor module; and the image sensor array is arranged in a square pattern.

14. The electronic device of claim 13, wherein:

each of the first, second, third, and fourth tiltable image sensor modules is tiltable in horizontal and vertical directions; and in the second mode, the at least one processing device is configured to tilt the first, second, third, and fourth tiltable image sensor modules in different directions.

15. The electronic device of claim 13, wherein, in the second mode, the at least one processing device is configured to:

tilt a first pair of the tiltable image sensor modules in one direction; and tilt a second pair of the tiltable image sensor modules in an opposite direction.

16. The electronic device of claim 15, wherein the at least one processing device is further configured to:

capture image frames of a scene using the tiltable image sensor modules;

combine the image frames to produce a panoramic image of the scene; and blur a background of the scene in the panoramic image based on depths identified using different pairs of the image frames.

17. A non-transitory computer readable medium containing instructions that when executed cause at least one processor of an electronic device to:

actuate at least one actuator in a direction substantially parallel to a surface of the electronic device to change first and second tiltable image sensor modules of an image sensor array of the electronic device between a first mode and a second mode, the first and second tiltable image sensor modules hingedly connected together, wherein the instructions when executed cause the at least one processor to:

in the first mode, control a positioning of the first and second tiltable image sensor modules so that (i) a first optical axis of the first tiltable image sensor module and a second optical axis of the second tiltable image sensor module are substantially perpendicular to the surface of the electronic device and (ii) the first and second tiltable image sensor modules are within a thickness profile of the electronic device; and in the second mode, control a tilting of the first and second tiltable image sensor modules so that (i) the first optical axis of the first tiltable image sensor module and the second optical axis of the second tiltable image sensor module are not perpendicular to the surface of the electronic device and (ii) at least part of the first and second tiltable image sensor modules are no longer within the thickness profile of the electronic device.

18. The non-transitory computer readable medium of claim 17, further containing instructions that when executed cause the at least one processor to:

obtain image frames of a scene captured using the first and second tiltable image sensor modules; and combine the image frames to produce a panoramic image of the scene.

19. The non-transitory computer readable medium of claim 17, further containing instructions that when executed cause the at least one processor, in the second mode, to control the tilting of the first and second tiltable image sensor modules and a tilting of third and fourth tiltable image sensor modules so that the first, second, third, and fourth tiltable image sensor modules are tilted in different directions.

20. The non-transitory computer readable medium of claim 19, further containing instructions that when executed cause the at least one processor to:

obtain image frames of a scene captured using the tiltable image sensor modules;

combine the image frames to produce a panoramic image of the scene; and blur a background of the scene in the panoramic image based on depths identified using different pairs of the image frames.

21. The non-transitory computer readable medium of claim 19, wherein the instructions when executed cause the at least one processor to:

tilt a first pair of the tiltable image sensor modules in one direction; and tilt a second pair of the tiltable image sensor modules in an opposite direction.

22. The non-transitory computer readable medium of claim 17, wherein the instructions that when executed cause the at least one processor to activate the at least one actuator comprises instructions that when executed cause the at least one processor to activate multiple actuators.

* * * * *